United States Patent
Sauder et al.

(10) Patent No.: US 7,334,532 B2
(45) Date of Patent: Feb. 26, 2008

(54) VACUUM SEED METER AND RETROFIT KIT FOR CELLED-DISK VACUUM METERS

(75) Inventors: Gregg A. Sauder, Tremont, IL (US);
Derek A. Sauder, Tremont, IL (US);
Justin L. Koch, Deer Creek, IL (US);
Jeremy J. Hodel, Roanoke, IL (US);
Chad E. Plattner, Tremont, IL (US)

(73) Assignee: Precision Planting, Inc., Tremont, IL (US)

( * ) Notice: Subject to any disclaimer, the term of this patent is extended or adjusted under 35 U.S.C. 154(b) by 0 days.

(21) Appl. No.: 11/465,164

(22) Filed: Aug. 17, 2006

(65) Prior Publication Data

US 2007/0039529 A1    Feb. 22, 2007

Related U.S. Application Data

(60) Provisional application No. 60/710,014, filed on Aug. 19, 2005.

(51) Int. Cl.
*A01C 7/00* (2006.01)
*A01C 9/00* (2006.01)

(52) U.S. Cl. .................................... 111/185
(58) Field of Classification Search ............... 111/174, 111/177–185

See application file for complete search history.

(56) References Cited

U.S. PATENT DOCUMENTS

| 4,917,029 A | * | 4/1990 | Upadhyaya et al. | ........ 111/185 |
| 5,170,909 A | | 12/1992 | Lundie et al. | |
| 7,093,548 B2 | * | 8/2006 | Eben et al. | .................. 111/185 |

OTHER PUBLICATIONS

"Double Eliminator for Pro-Series™ Vacuum Meters"; (2 pages) dated Jan. 10, 2005.

Web page from S.I. Distributing Inc. regarding VenHuizen AccuVac Update Kit; (1 page); Date Unknown.

* cited by examiner

*Primary Examiner*—Christopher J. Novosad
(74) *Attorney, Agent, or Firm*—Larkin Hoffman Daly & Lindgren Ltd.; Thomas J. Oppold

(57) ABSTRACT

A vacuum meter and a retrofit kit. The retrofit kit is particularly adapted for modifying or retrofitting vacuum meters configured with the centerline of the seed discharge chute or seed tube offset from the seed-side face of the seed disk, examples of which include the John Deere Max-Emerge® family of vacuum meters. The vacuum meter and retrofit includes an offset disk having a seed plane disposed in substantial alignment with a central axis of the discharge chute the vacuum meter housing.

24 Claims, 18 Drawing Sheets

VACUUM SEED METER AND RETROFIT KIT FOR CELLED-DISK VACUUM METERS

BACKGROUND OF THE INVENTION

It is well recognized that proper and uniform spacing of seed in the furrow is essential to maximizing crop yield. The first step in achieving uniform spacing is to accurately dispense one seed and one seed only at the proper timing. This "singulation" accuracy is a performance benchmark that is well known for many types of seed meters and is often tested on a seed meter test stand prior to the beginning of the planting season. The second step is to deliver the seed to the furrow with the same (or nearly the same) consistency of spacing as the seeds are discharged by the meter. The vast majority of agricultural planters rely upon a seed tube to direct the seeds downwardly and rearwardly from the meter and into the furrow.

There are many different types of seed meters, but each of the different types will fall into one the general classes of meters: (i) mechanical seed meters, such as disclosed in U.S. Pat. No. 3,627,050 to Hansen et al.; (ii) air seed meters, such as disclosed in U.S. Pat. No. 3,888,387 to Deckler; and (iii) vacuum seed meters, such as disclosed in U.S. Pat. No. 5,170,909 to Lundie et al. Many of these meters have historically operated at singulation accuracies of between 90 to 95%. Recent improvements to mechanical meters have resulted in singulation accuracies as high as 98 to 99%. The vacuum meter, too, has achieved singulation accuracy of up to 99% on some seed types but vacuum meters are often plagued with several problems.

One of the problems plaguing singulation accuracy of vacuum meters in general is the recently developed seed coatings often applied to the seed for treatment of rootworm and secondary pests. These seed coatings make it more difficult to entrain the seed over the apertures in the vacuum disks. Another problem affecting singulation accuracy with vacuum meters that utilize "celled-disks" (i.e., disks with indentations or "cells" around each aperture in the disk, such as the disks disclosed in U.S. Pat. No. 5,170,909 to Lundie et al.), is that such meters have a higher tendency to plant "skips" and "doubles" in near succession when planting flat shaped seeds. Despite this tendency, however, celled-disk vacuum meters offer the unique advantage of permitting the meter to generally operate at lower vacuum levels than meters that use flat or non-celled disks (i.e., vacuum disks with apertures only) because the indentations or cells assist in holding the seeds in place, thus requiring less vacuum pressure to entrain the seeds.

In order to reduce the higher amount of skips and doubles generally experienced when using celled-disk vacuum meters, most celled-disk vacuum meters, such as the John Deere MaxEmerge® vacuum meter, utilize different celled-disks each with a different cell profile and/or aperture configuration. These celled-disks must be changed or swapped-out based upon the size of the seed being planted to achieve acceptable singulation accuracies. For example, the MaxEmerge vacuum meter has different celled-disks for field corn, popcorn, sweet corn, soybeans, cotton, sorghum, sugar beets, sunflowers, edible beans/peas, peanuts, and for melons/squash/cucumbers.

Another problem with celled vacuum disks is that spacing accuracy is adversely affected because the seed must slide out of the cell, subjecting sequential seeds to random and variable release times due to differences friction, seed orientation, etc. The end result is that with celled-disk vacuum meters, singulation accuracy is often poor with many flat seed types and seed spacing is inconsistent spacing on nearly all seed types.

In an attempt to improve singulation accuracy, farmers have tried to use non-celled disks with meters originally designed for celled-disk meters. For example, with the John Deere MaxEmerge vacuum meters, farmers started using one of the specialty disks designed by John Deere for planting irregular seeds such as sweet corn (thus, this disk is often referred to as the "sweet corn disk"). The sweet corn disk is flat on the planting surface and does not have any indentations or cells to hold the seed. Therefore, the timing of release of the seeds from the disk is more consistent because the aforementioned seed release problem due to friction, etc. is eliminated thereby reducing the amount of skips.

Similar to the sweet corn disk, an update kit, known as the Accu-Vac Update Kit, available from S.I. Distributing, Inc. St. Marys, Ohio, utilizes a flat, non-celled disk. The Accu-Vac disk has larger apertures in order to ensure the seeds are adequately entrained so they do not prematurely slough-off as the disk rotates. Unfortunately, by increasing the aperture size, the vacuum flow must necessarily increase in order to maintain the same amount of negative pressure to prevent the seeds from prematurely sloughing-off. Some planter vacuum systems are not capable of supplying the vacuum flow necessary to utilize the Accu-Vac update kit.

While the sweet corn disk and the Accu-Vac disk have markedly increased singulation performance when used in place of celled-disk, their use has also resulting in a significant decrease in the accuracy and uniformity of in-furrow seed-to-seed spacing. This is due to the fact that the trajectory of the seed upon release from these flat disks is not the same as the trajectory of the seed when released from a celled-disk for which the meter was originally designed. It should be appreciated that with celled-disks, the indentation of the cell imparts a horizontal velocity to the seed as it slides out from the cell. Vacuum meters originally designed for use with celled-disks, such as the MaxEmerge vacuum meter, have the centerline of the seed tube offset a predetermined horizontal distance to account for the horizontal distance traveled by the seed upon its entry into the seed tube. Thus, because flat non-celled disks do not impart a horizontal velocity to the seed upon release, the seed will not enter the seed tube at its centerline. As a result, the seeds will tend to experience more ricochet as they travel down the seed tube as opposed to free-falling and then smoothly sliding along the forward wall of the seed tube as would otherwise generally be experienced if the seed entered the seed tube at its centerline if released from a celled-disk. Tests have shown that the more seeds ricochet within the seed tube, the more inconsistent will be the in-furrow seed-to-seed spacing. This is due to sequential seeds traveling at different velocities through the tube. For example, if one seeds ricochets off the sidewalls of the seed tube three times before being dispensed into the furrow versus a seed that does not ricochet at all, or a seed that only ricochets once or twice, the seeds experiencing more ricochet will exit the seed tube at a slower velocity than those experiencing fewer ricochets. This difference in seed velocity upon exiting the seed tube results in inconsistent seed-to-seed spacing in the furrow.

Accordingly, there remains a need for an improved vacuum seed meter and/or a retro-fit kit for use with existing vacuum seed meters such as the John Deere MaxEmerge vacuum meter that can deliver very high seed singulation accuracy as well as in-furrow seed to seed spacing while requiring minimal swapping-out of disks and minimal adjustment to the singulators or other components of the meter.

SUMMARY

The present invention is directed to a vacuum meter having an offset disk rotatably disposed within a housing with a seed discharge chute. The offset disk has a seed plane disposed in substantial alignment with a central axis of the discharge chute.

The present invention is also directed to a retrofit kit particularly adapted for modifying or retrofitting vacuum meters configured with the centerline of the seed discharge chute or seed tube offset a distance "X" from the seed-side face of the seed disk, examples of which include the John Deere MaxEmerge® family of vacuum meters. In a preferred embodiment, the retrofit kit includes an offset disk having a base plane and a seed plane, the base plane corresponding to the plane of seed-side face of the celled disk of which it replaces. The seed plane is offset from the base plane a distance substantially corresponding to the distance X. The preferred retrofit kit also includes a singulator assembly, a replacement isolator brush assembly, a liner, a baffle, and a fragment extractor for removing fragments lodged in said apertures from a seed side face of said offset disk.

DETAILED DESCRIPTION

Figure 1:
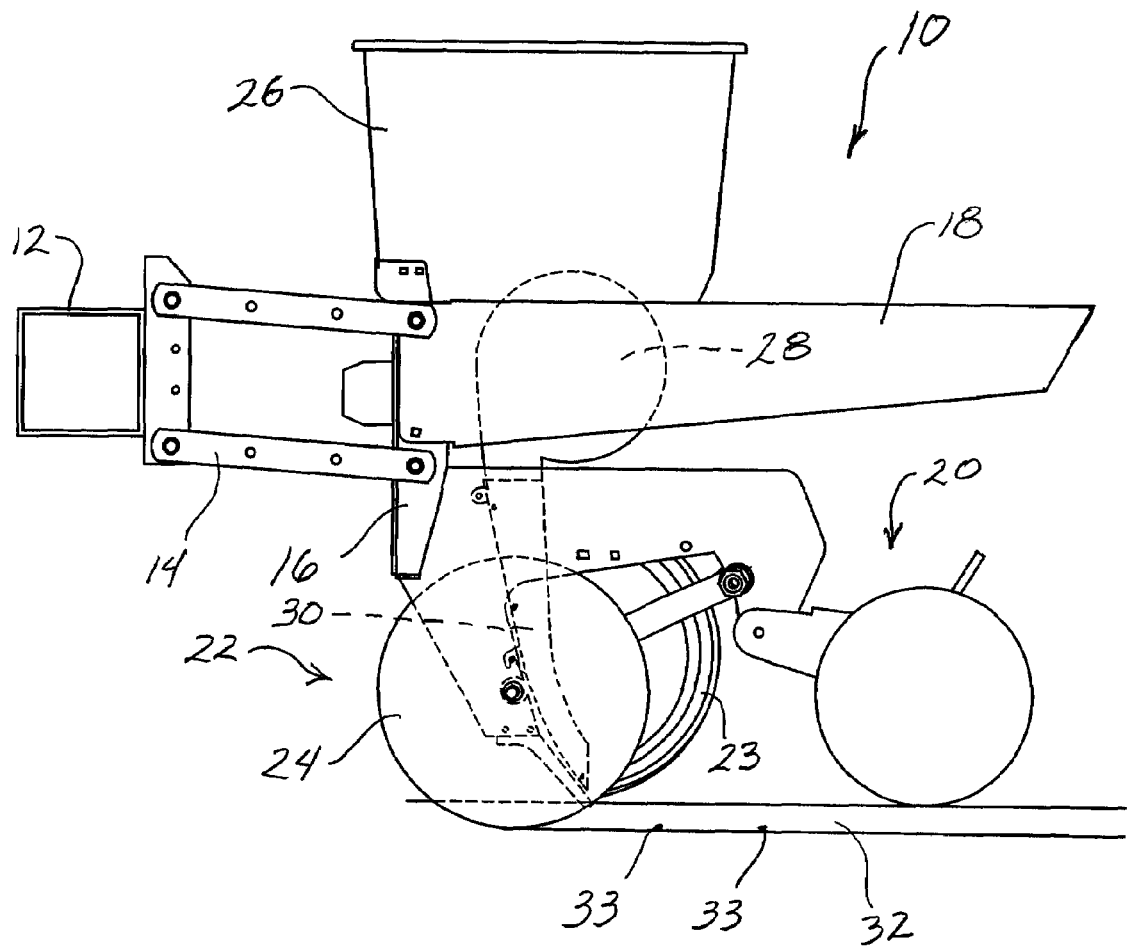
FIG. 1 is a side elevation view of a conventional planter row unit.

Referring now to the drawings, wherein like reference numerals designate identical or corresponding parts throughout the several views, FIG. 1 illustrates a side elevation view of a single planter row unit 10 of a conventional planter implement. It should be understood that a conventional planter is comprised of a plurality of row units 10 spaced transversely along the main frame 12 of the planter. However, for simplicity, only one row unit 10 is shown and described herein.

The planter row unit 10 is attached to the main frame 12 through a parallel arm linkage 14. The row unit 10 comprises a row-unit frame 16 that supports a hopper beam 18. The hopper beam 18, supports the furrow closing system 20 and a furrow opener 22. The furrow opener 22 includes pair of depth gage wheels 23, each of which is disposed adjacent a furrow opener disk 24. In FIG. 1 the nearest depth gauge wheel is shown removed to better shown the opener disk 24 and seed tube 30. The furrow opener disks 24 form a V-shaped furrow 32 in the soil as the planter traverses the field. The hopper beam 18 supports a seed hopper 26 which contains a supply of seed 33. The seeds 33 in the seed hopper 26 are communicated to the vacuum seed meter 28. The vacuum seed meter 28 ideally discharges individual seeds at regular spaced intervals into the seed tube 30 as the planter traverses the field. The seed tube 30 directs the seed 33 downwardly and rearwardly and deposits the seed into the seed furrow 32. The closing assembly 20 covers the deposited seed 33 in the furrow 32.

Figure 2:
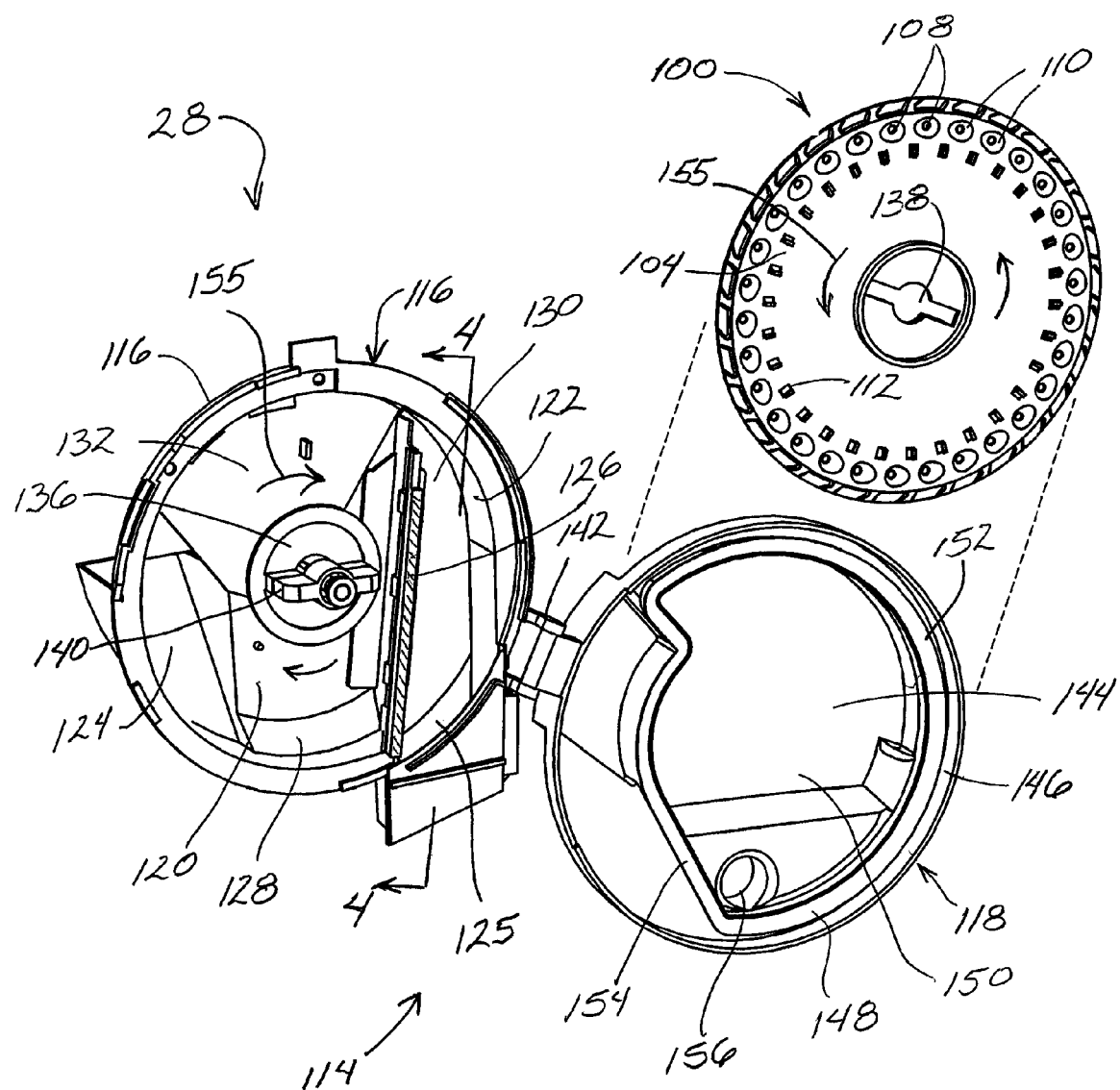
FIG. 2 is a partially exploded perspective view of a conventional vacuum meter utilizing a celled-disk.

FIG. 2 shows an exploded perspective view of a conventional vacuum meter 28, such as the John Deere MaxEmerge® vacuum meter, which is disclosed in U.S. Pat. No.

Figure 4:
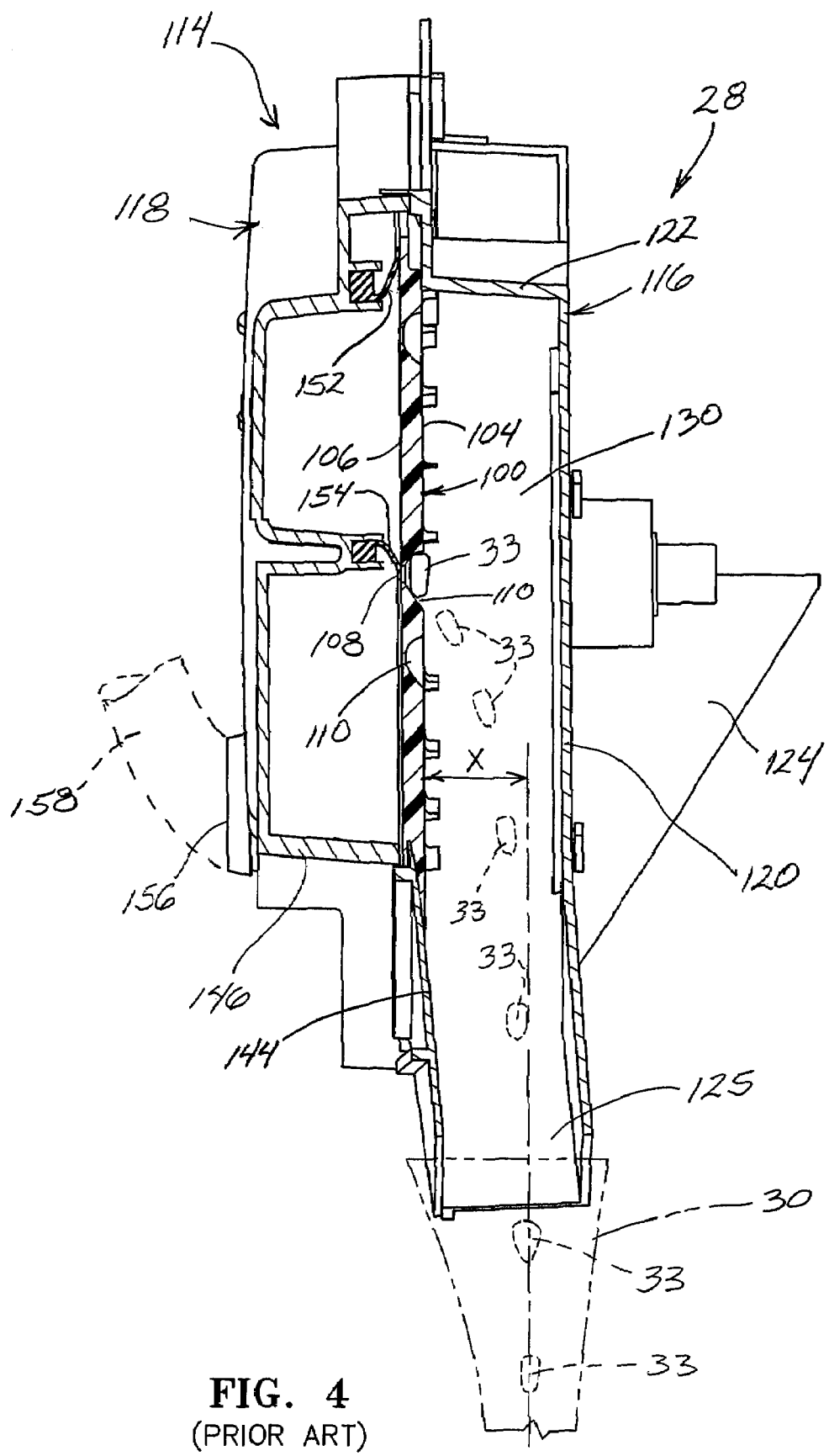
FIG. 4 is a cross-sectional view of the conventional vacuum meter of FIG. 2 as viewed along lines 4-4 of FIG. 2 illustrating the release trajectory of the seed from a celled-disk.

5,170,909 to Lundie et al., incorporated herein in its entirety by reference. The John Deere MaxEmerge vacuum meter 28 includes a celled-disk 100 having a seed-side face 104 and a vacuum-side face 106 (FIG. 4). A plurality of radially spaced apertures 108 extend through the disk 100. Each aperture 108 is surrounded by an indentation or concave cell 110. A plurality of radially spaced ribs 112 are disposed on the seed-side face 104 of the celled-disk 100 which serve to agitate the seed in the seed pool (identified later).

The celled-disk 100 is rotatably mounted within a housing 114. The housing 114 includes a back cover 116 and a front cover 118. The back cover 116 comprises a generally circular and planar back wall 120, a cylindrical sidewall 122, a seed inlet chute 124, and a seed discharge chute 125. An isolator brush 126 separates the back cover 116 into a seed pool area 128 and a seed discharge area 130. A rotatable baffle 132 (shown in the full open position) is mounted adjacent the back wall 120 and is pivotable about the central hub 136 to control the depth of seed in the seed pool area 128. The hub 136 projects forwardly from the back wall 120 and rotatably receives the celled disk 100. The celled-disk 100 includes a keyed central aperture 138 that receives a complimentary shaped handle 140. The celled disk 100 is removably secured to the rotatable hub 136 by the spring biased handle 140 which is rotated relative to the keyed aperture 138. The spring biased handle 140 bears against the seed-side face 104 of the celled-disk 100 and locks in place. A more complete description of how the disk 100 is mounted within the housing 114 is described in more detail U.S. Pat. No. 4,664,290 to Martin et al., incorporated herein in its entirety by reference.

The front cover 118 is attached to the back cover 116 by a hinge 142. The front cover 118 comprises a generally circular and planar front wall 144 and a substantially cylindrical side wall 146. A resilient seal 148 extends around a portion of the front wall 144 thereby defining a vacuum chamber 150. The seal 148 seals the vacuum chamber 150 against the vacuum-side 106 of the celled-disk 100. The seal 148 includes an arcuate segment 152 extending between about the 10:00 position to about the 6:00 position as the front cover 118 is viewed in FIG. 2. The radius of the arcuate segment 152 is slightly greater than the radius of the apertures 108 in the celled-disk 100, such that as the celled-disk 100 rotates through the vacuum chamber 150 and seed pool area 128 (in the direction as indicated by arrow 155), the apertures 108 are exposed to a constant negative pressure or vacuum. A second segment 154 of the seal 148 extends between and joins the two ends of the arcuate segment 152. The second segment 154 defines the edge of the vacuum chamber 150 where the negative pressure or vacuum is cut-off from the apertures 108 as they rotate past the second segment 154. The seal 148 is attached to the front cover 118 by a channel (not visible) formed in the front wall 144 into which a base of the seal 148 is received.

A resilient strap (not visible) secures the front cover 118 to the back cover 116 in the closed position. A vacuum port 156 through the front wall 144 of the cover 118 is in communication with the vacuum chamber 150. A vacuum hose 158 (FIG. 4) is connected at one end to the vacuum port 156 and at its other end, ultimately, to vacuum source (not shown). Thus, in operation, the vacuum source creates a negative pressure or vacuum within the vacuum chamber 150 resulting in a pressure differential between the seed-side face 104 and the vacuum side face 106 of the celled-disk 100. It should be appreciated that this pressure differential will cause seeds within the seed pool area 128 (which is directly opposite the lower portion of the vacuum chamber 150 on the seed-side face 106 of the disk 102) to be entrained over the apertures 108 on the seed-side face 104 of the celled-disk 100 until the apertures 108 rotate past the second segment 154 of the resilient seal 148 defining the edge of the vacuum chamber 150, thereby cutting-off the negative pressure. As best illustrated in FIG. 4, once the pressure differential is removed, the seed 33 free-falls under force of gravity from the face of the celled-disk 100 and through the discharge chute 125 where it enters the seed tube 30 and is directed downwardly and rearwardly until being deposited into the seed furrow 32 (FIG. 1).

Figure 3:
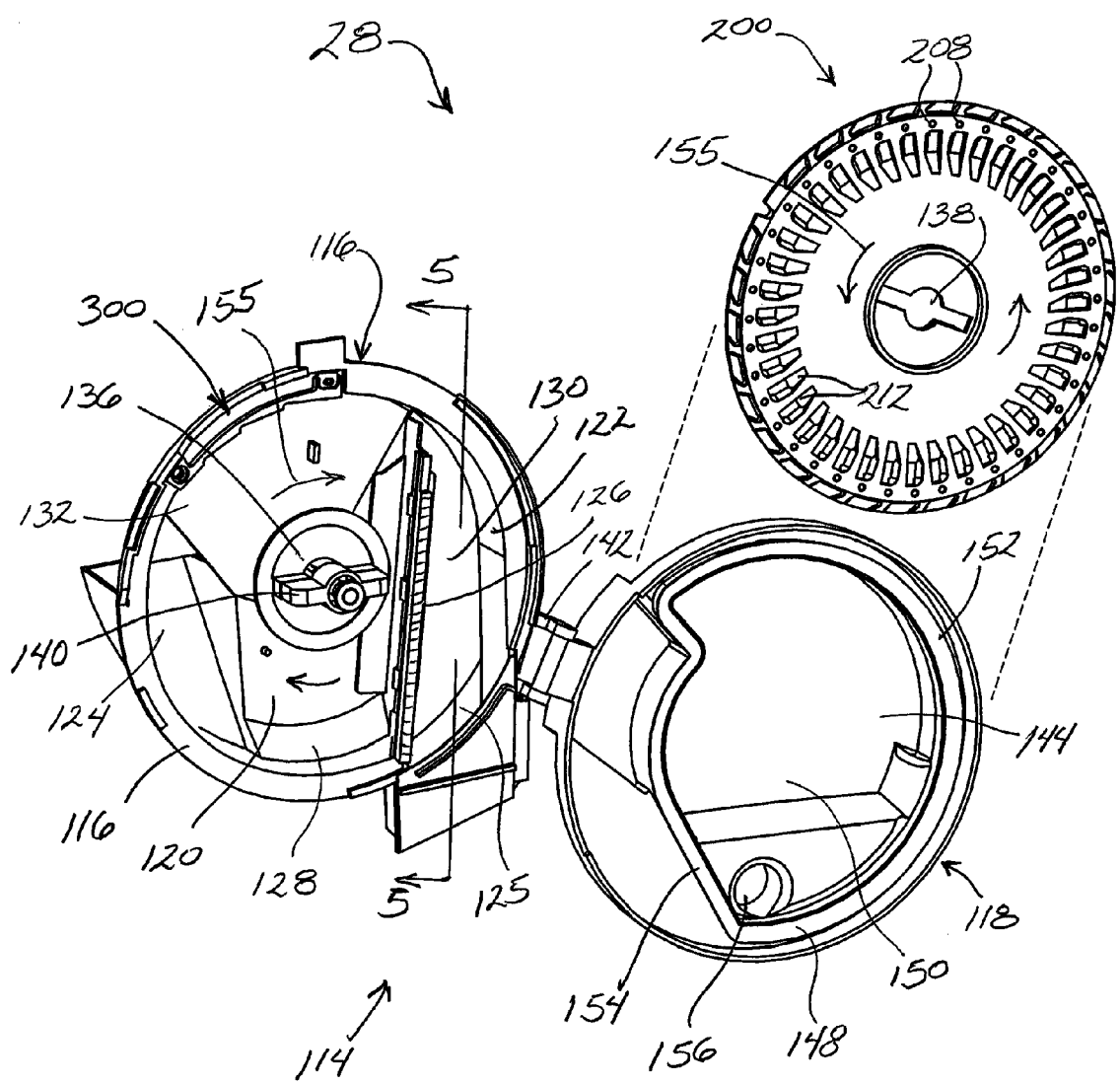
FIG. 3 is a partially exploded perspective view of the conventional vacuum meter of FIG. 2 utilizing a flat non-celled disk.

The vacuum seed meter 28 of FIG. 3 is identical to that of FIG. 2, except that the celled-disk 100 is replaced with a flat non-celled disk 200, such as with the sweet corn disk or an Accu-Vac disk as previously described in the BACKGROUND. A conventional "double eliminator" or seed stripper 300 is also added. It being understood that seed strippers are generally not required for celled-disks because the geometry of the cell generally serves to prevent multiple seeds from being entrained over a single aperture. The seed stripper 300 serves to remove any seed multiples or "doubles" that may become entrained over a single aperture 208 by slightly bumping or agitating the seeds 33 as they rotate past the stripper 300 thereby causing one of the seeds to be knocked-off or "stripped" from the aperture 208.

Figure 5:
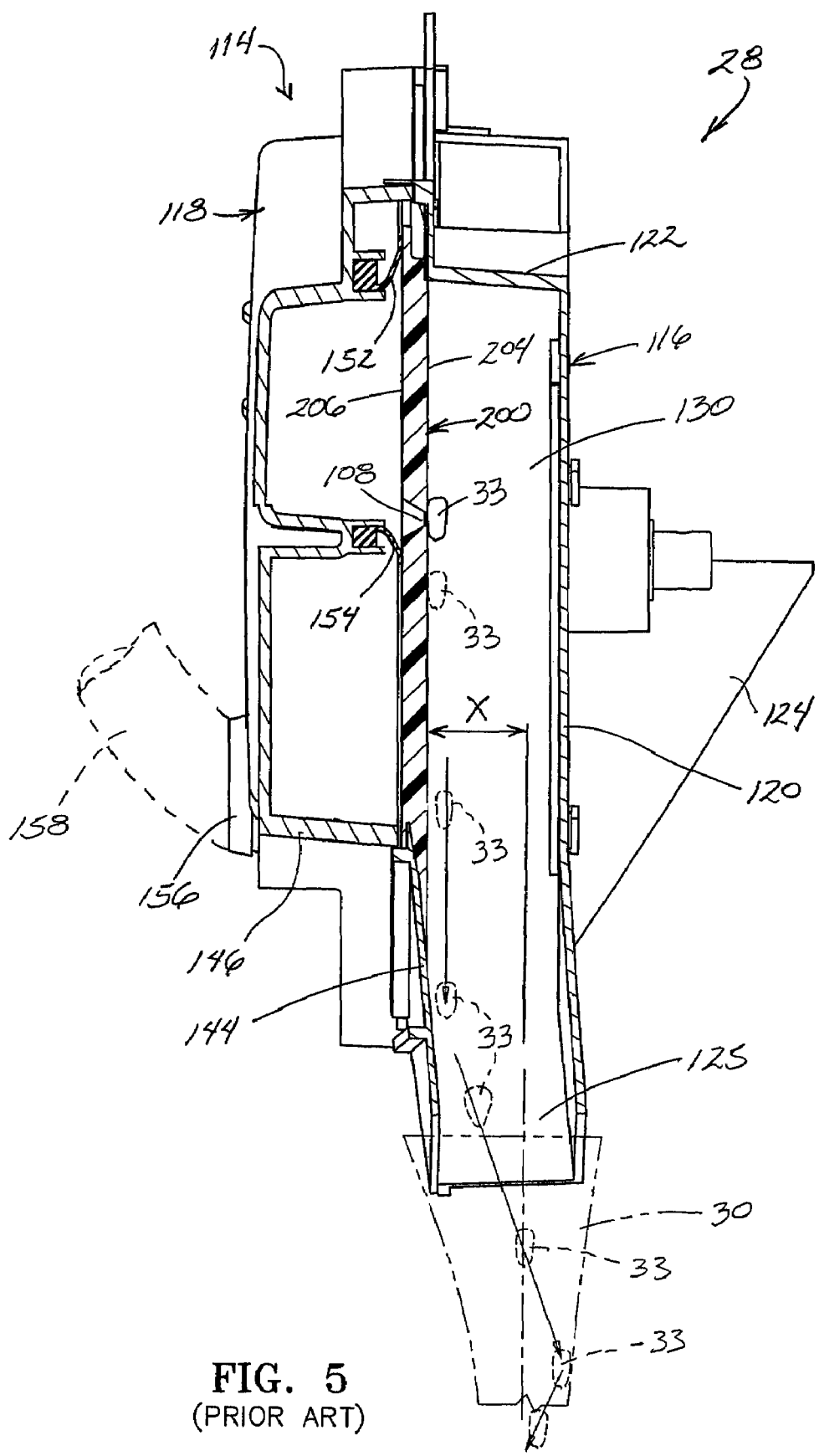
FIG. 5 is a cross-sectional view of the conventional vacuum meter of FIG. 3 as viewed along lines 5-5 of FIG. 3 illustrating the release trajectory of the seed from a flat non-celled disk.

FIGS. 4 and 5 are cross-sectional views of the vacuum meters 28 as viewed along lines 4-4 and 5-5 of FIGS. 2 and 3, respectively. Referring first to FIG. 4, the trajectory of the seed is illustrated as it falls from the seed-side face 106 of the celled-disk 100 upon the removal of the vacuum as the aperture 108 passes the seal 148 defining the edge of the vacuum chamber 150. As illustrated in FIG. 4, due to the concave profile of the cells 110, upon removal of the vacuum the seed will slide out from the concave cell 110 in a resultant direction with both a horizontal and vertical component as the seed free-falls under force of gravity toward the discharge chute 125. Due to the initial horizontal direction upon leaving the face of the disk, by the time the seed reaches the discharge chute 125 and enters the seed tube 30, the seed will have traveled a horizontal distance from the seed-side face 106 of the disk 102 as denoted by dimension "X". In order that the seed enter the seed tube 30 at or near its centerline, the centerline of the seed tube 30 is offset from the seed-side face 106 of the disk 102 by that same horizontal distance "X".

While FIG. 4 illustrates the ideal trajectory of the seed 33 upon release from the aperture 108 until it enters the seed tube 30, it should be understood that the surface friction between the seeds 33 and the concave cells 110 will vary due to differences in coatings of the seed, the shape of the seed, burrs or other surface irregularities of the cells 110, etc., thereby resulting in slight deviations between the trajectories and release times of sequential seeds. Accordingly, it should be appreciated that these deviations in trajectories and release times will translate into inconsistencies in spacing between sequential seeds in the furrow. In addition, as previously identified, celled-disks 100 with certain seed geometries are more prone then others to load two seeds into the cell 110 thereby resulting in doubles being planted in the furrow. If the vacuum level is lowered to attempt to reduce the likelihood for the cells 110 to load doubles, then the lower vacuum pressure may result in some of the seeds sloughing off as the disk 100 rotates, thereby resulting in empty cells which translate into seed "skips" in the furrow.

FIG. 5 illustrates what may happens to the seed 33 when a conventional flat non-celled disk 200 (such as the sweet corn disk or Accu-Vac disk) is used in a vacuum meter 28 originally designed for use with a celled-disk 100. It should be appreciated that because there are no concave cells on the seed-side face 204 of the disk 200 surrounding the apertures 208, the seed is not released with an initial horizontal direction. As a result, the seed 33 free-falls substantially vertically from the seed-side-face 204 of the disk 200 upon the aperture 208 passing the seal 148 defining the edge of the vacuum chamber 150. Because the seed tube 30 remains offset to accommodate the horizontal distance expected to be traveled by the seed when using a celled-disk for which the meter 28 was designed, the seed 33 will instead hit the discharge chute 125 causing it to ricochet or deflect toward the opposite wall of the seed tube 30 as illustrated and possibly resulting in additional side-to-side ricochets as the seed travels the length of the seed tube. In addition to side-to-side seed ricochet, with flat disks 200 such as the sweet corn disk and Accu-Vac disks, the seeds 33 are also more likely to experience front-to-back seed trajectory deviations within the seed tube due to the fact that the pitch diameter 213 of the apertures 208 on a flat disk 200 is generally greater than the pitch diameter 113 of the apertures 108 of celled-disks 100. This larger pitch diameter may cause the seeds to contact the sidewall 122 of the back cover 116, thereby slowing the travel of the seed. Additionally, if the seed happens to contact just at the bottom edge of the sidewall 122, the seed will begin to tumble as it falls, resulting in a different downward velocity than seeds which enter the tube without contacting the sidewall 122.

As previously discussed, tests have shown that the most accurate and consistent seed-to-seed spacing within the furrow occurs when sequential seeds enter at or near the centerline of the seed tube. When the seeds enter the seed tube at or near the centerline, the seeds first make contact with the rearwardly curving front wall of the seed tube between ⅓ to ½ of the way down the length of the tube which results in the seeds smoothly sliding along that forward wall of the seed tube until exiting the tube.

The present invention is directed at overcoming the foregoing problems associated with celled disks by taking advantage of the features and benefits of flat faced disks. In addition, the present invention overcomes the problems and disadvantages of using a flat faced disk such as the conventional sweet corn disks and the Accu-Vac disks by offsetting the seed side face so that it is substantially in line with the centerline of the seed tube thereby permit the seeds to fall nearly vertically from the face of the disk and into the seed tube at or near its centerline. Accordingly, it should be appreciated the present invention is particularly adapted for modifying or retrofitting vacuum seed meters configured such that the centerline of the seed tube is offset from the seed-side face of the seed disk, such as, for example, the John Deere MaxEmerge® family of vacuum meters.

Figure 6:
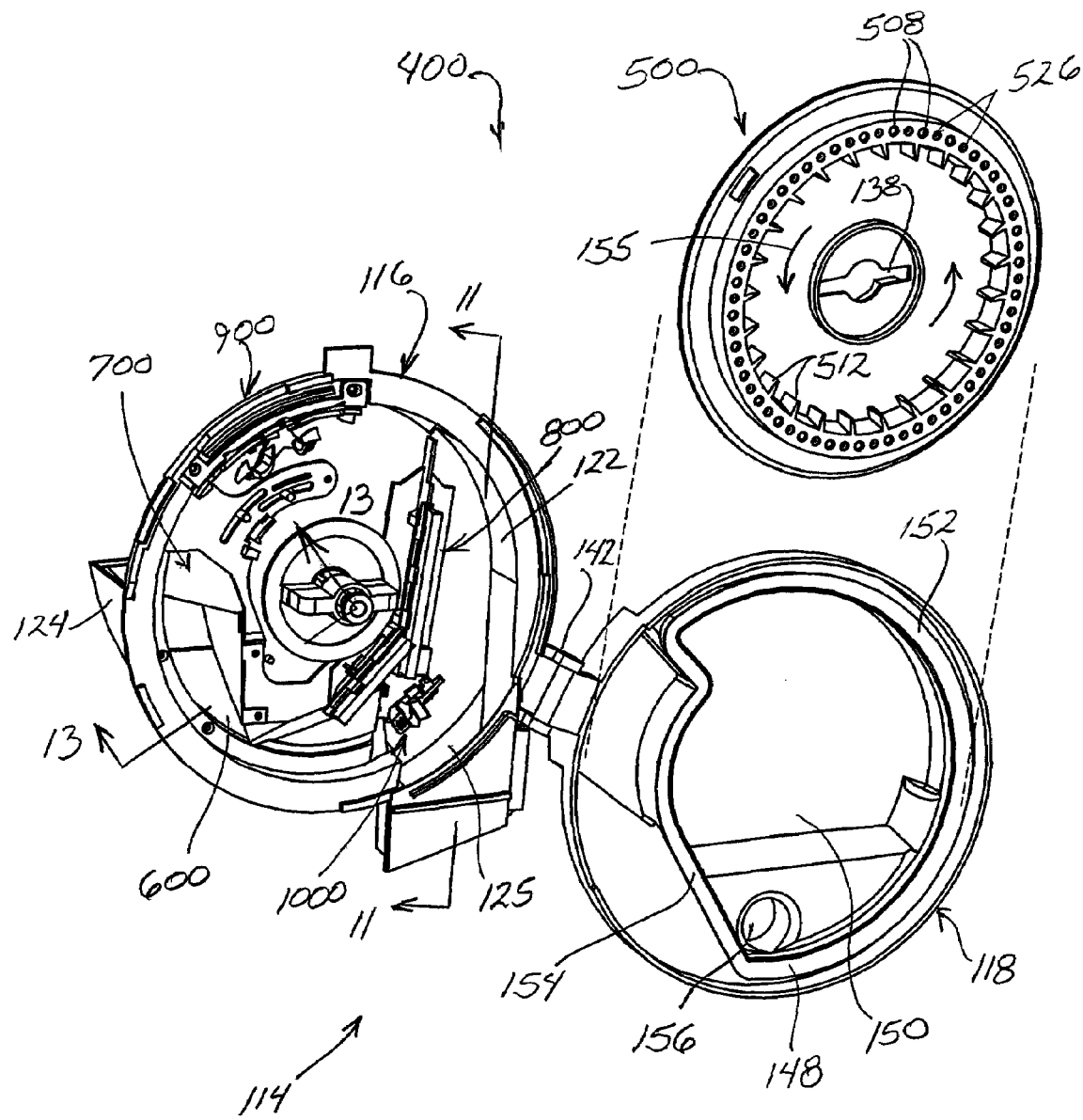
FIG. 6 is a partially exploded perspective view of one embodiment of a vacuum seed meter of the present invention.

FIG. 6, illustrates a partially exploded preferred embodiment of the vacuum meter 400 of the present invention. As should be evident, the vacuum meter 400 is preferably substantially the same as the vacuum meter 28 as illustrated in FIGS. 2 and 3 except that certain components have been modified and/or replaced. Accordingly, it should be appreciated that the system and method of the present invention is particularly adapted for modifying or retrofitting vacuum meters 28 configured with the centerline of the seed tube 30 offset from the seed-side face of the seed disk, examples of which include the John Deere MaxEmerge® family of vacuum meters.

Figure 7:
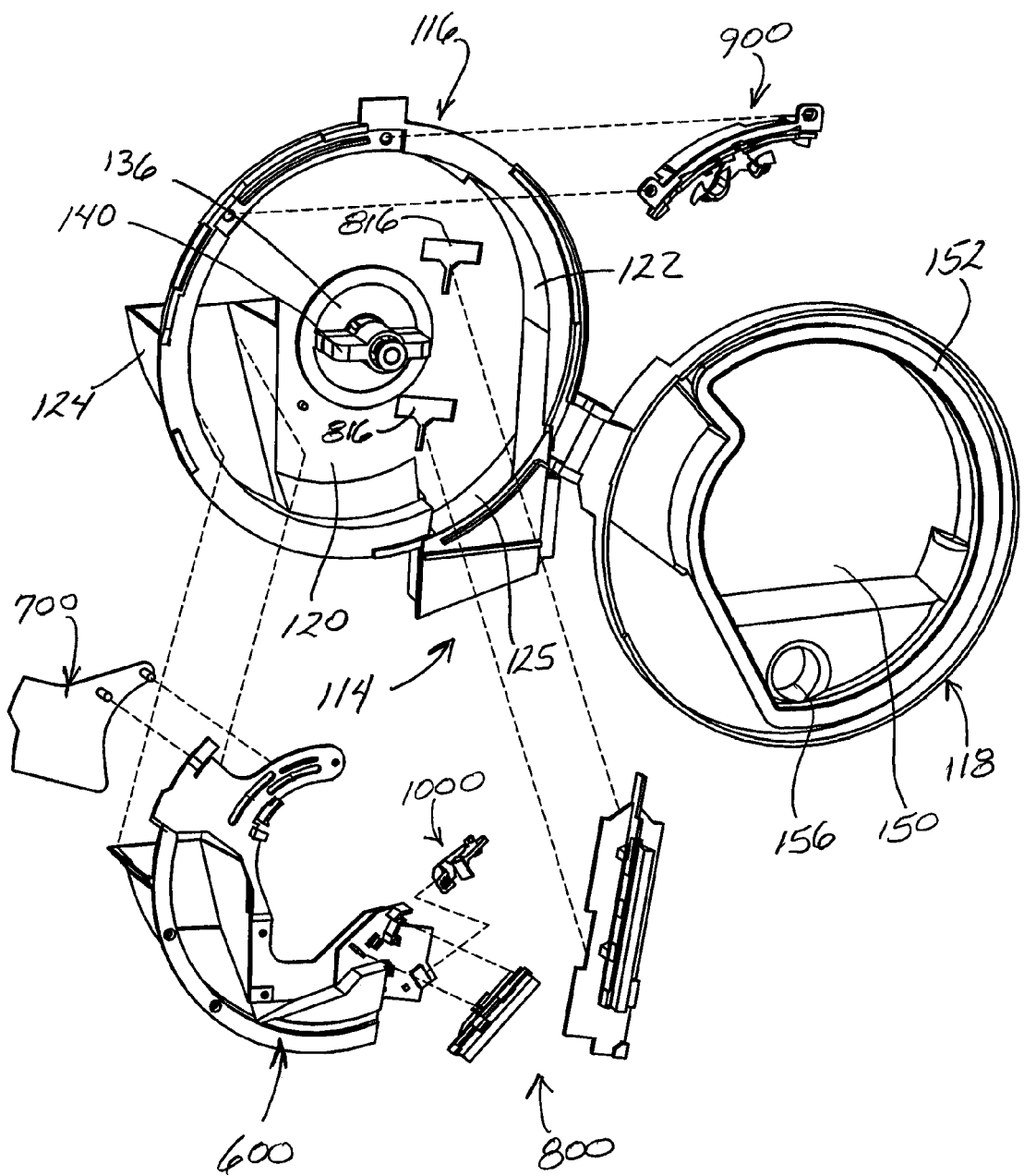
FIG. 7 is an exploded perspective view of the vacuum meter of FIG. 6 showing the preferred embodiment of the components of the present invention for retrofitting a conventional vacuum seed meter housing.

As best illustrated in FIG. 7, under the system and method of the present invention, the conventional celled-disk 100 of FIG. 2 or the conventional flat disk 200 of FIG. 3, is removed and replaced by an offset disk 500. Additionally, the isolator brush 126 is removed and replaced by an isolator brush assembly 800. Also, the baffle 132 is removed and replaced with a baffle 700. Further, the preferred system and method includes a seed pool liner assembly 600, a flexible singulator 900, and a fragment extractor 1000. The preferred embodiments of each of these elements is described separately below.

Figure 8:
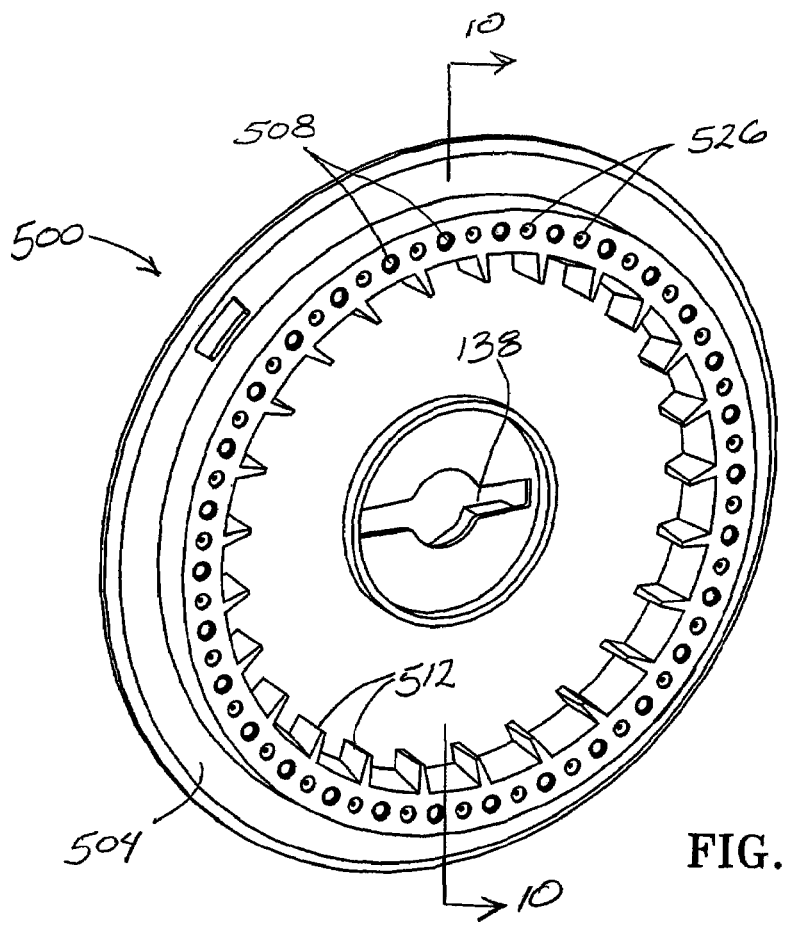
FIG. 8 is a perspective view of the seed-side face of the preferred embodiment of the offset disk of the vacuum seed meter of FIG. 6.
Figure 9:
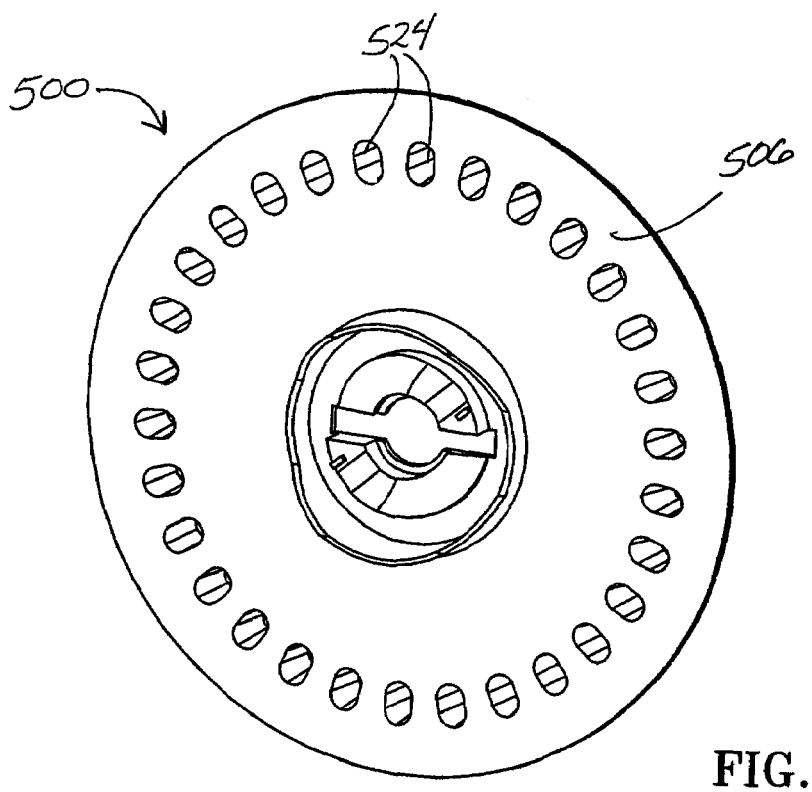
FIG. 9 is a perspective view of the vacuum side of the preferred embodiment of the offset disk of the vacuum seed meter of FIG. 6.
Figure 10:
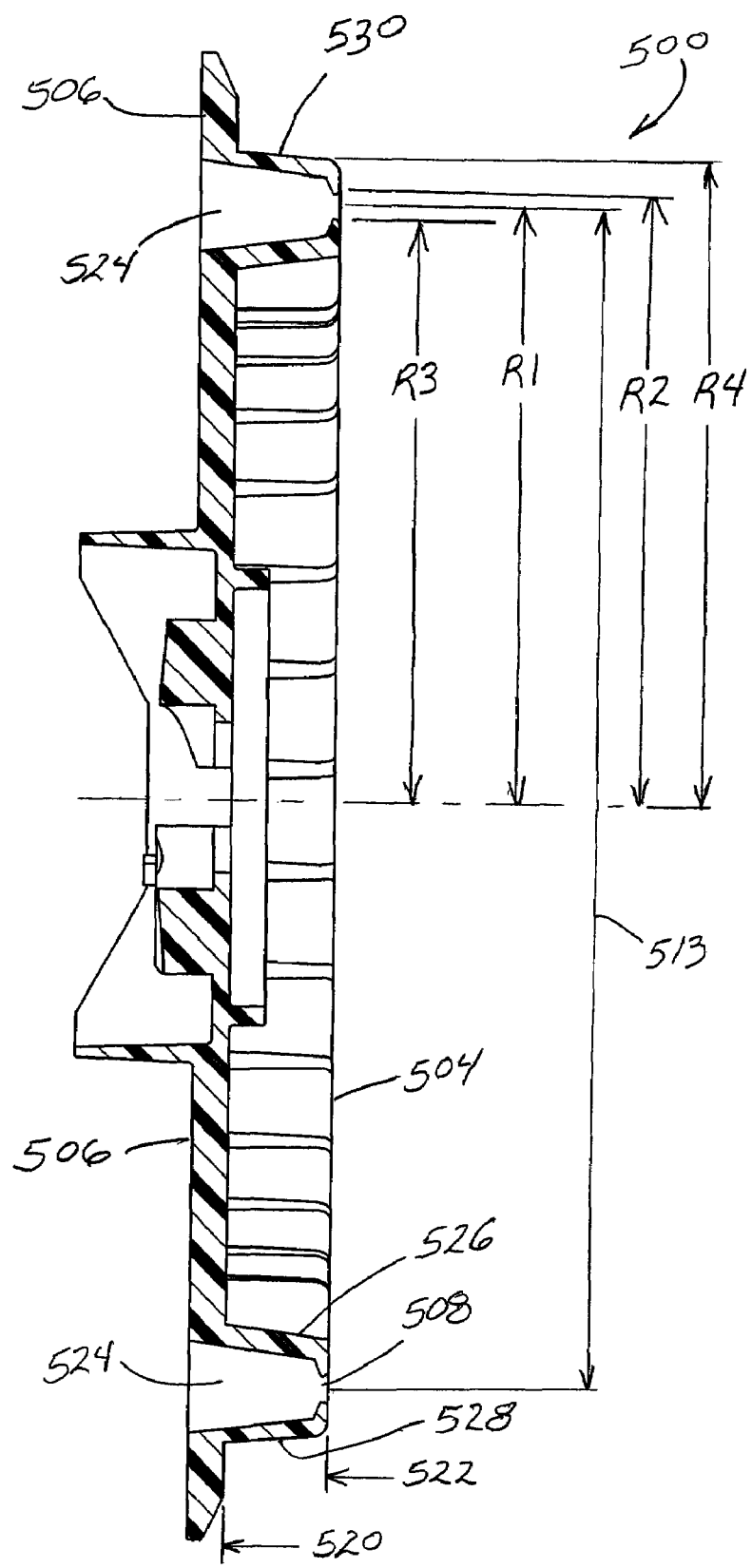
FIG. 10 is a cross-sectional view of the offset disk as viewed along lines 10-10 of FIG. 8.

A preferred embodiment of the offset disk 500 is shown in FIGS. 8, 9 and 10. FIG. 8 is a perspective view of the preferred offset disk 500 shown from the seed-side face 504. FIG. 9 is a perspective view of the preferred offset disk 500 from the vacuum-side face 506. FIG. 10 is a cross-sectional view of the preferred offset disk 500 as viewed along lines 10-10 of FIG. 8. It should be understood that the offset disk 500 preferably includes the same keyed central aperture 138 as that found in the disks 100, 200 50 that the offset disk 500 is interchangeable with either the celled-disk 100 or flat non-celled disk 200 and mountable within the housing 114 in the manner as previously described with little or no modifications to the existing housing structure.

Figure 11:
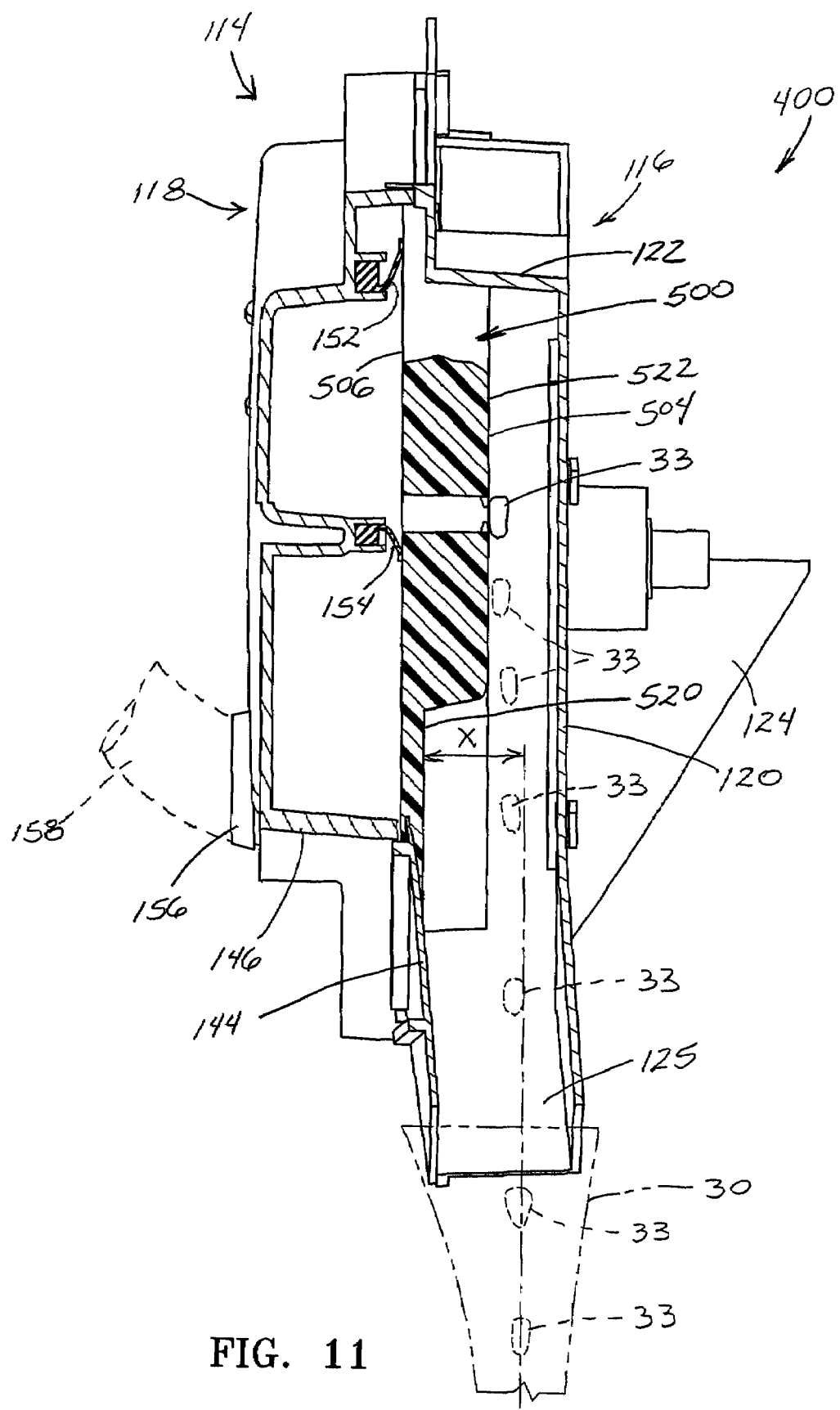
FIG. 11 is a cross sectional view of the vacuum seed meter of FIG. 6 as viewed along lines 11-11 of FIG. 6.

As best illustrated in FIG. 10, the seed-side face 504 of the offset disk 500 preferably comprises two primary planes offset from each other, the base plane 520, and the seed plane 522. As illustrated in FIG. 11, in comparison to FIGS. 4 and 5, when the offset disk 500 is disposed in the housing 114, the base plane 520 is preferably located at substantially the same plane that the seed-side face 104 of the celled disk 100 and the seed-side face 204 of the flat disk 200 occupy when disposed in the housing 114. The seed plane 522 is offset from the base plane 520 slightly less than the distance correspondence to the horizontal dimension "X" as illustrated and previously described in connection with FIG. 2 such that when the offset disk 500 is disposed within the housing 114, the seed plane 522 will be substantially in the same vertical plane as the centerline of the seed tube 30. In a typical embodiment, the distance between the base plane 520 and the seed plane 522 is generally between 0.600 and 0.750 inches but it should be appreciated that this distance may vary as necessary to accommodate the offset distance X.

As best illustrated in FIG. 10, in the preferred embodiment, the seed plane 522 is a raised planar surface extending from the base plane 520 by inner conical side wall 526 and an outer cylindrical sidewall 528 defining a cylindrical shoulder 530. Preferably extending inwardly from the inner sidewall 526 are the radially spaced agitating ribs 512 for agitating or stirring the seeds as the disk 500 rotates through the seed pool area. The agitating ribs 512 of the preferred embodiment of the offset disk 500 are preferably sized to more aggressively agitate the seed in the seed pool than is otherwise provided by the ribs 112 of the celled-disk 100. It is recognized that the need to aggressively agitate the seeds is particularly important with the new seed coatings on the market and maintaining fluidity of the seed pool is an important factor in the ability to load at least one seed on each aperture 508 as the apertures rotate through the seed pool.

As with the other disks 100, 200, the offset disk 500 includes a plurality of apertures 508 for entraining the seeds onto the face of the disk as it rotates through the seed pool. Depending on the type of seed to be planted, the apertures 508 may be equally radially spaced or the apertures 508 may comprise radially spaced groupings, or the apertures 508 may be disposed in multiple rows offset or radially aligned.

In the embodiment of FIG. 8, the apertures are shown equally spaced around a radius R1 defining a pitch diameter 513. The radius R1 or pitch diameter 513 is preferably sized such that upon release from the apertures the seeds enter the seed tube just behind the front wall of the seed tube thereby avoiding contact with forward wall of the back cover 116 of the housing 114, thus minimizing the likelihood of the seed experiencing front-to-back trajectory deviations upon entry into the seed tube 30 as experienced with the Accu-Vac or sweet corn disks 200 previously described in connection with FIG. 3. In the preferred embodiment a pitch diameter 513 of approximately 8.0 inches has been found to achieve satisfactory results.

The apertures 508 are preferably sized to provide the proper amount of air flow to entrain at least one seed to each aperture 508 without consuming excess air flow. The preferred aperture size at the seed plane 522 has found to be between 0.150 and 0.200 inches, most preferably 0.176 inches. Referring to FIGS. 9 and 10, on the vacuum-side face 506 of the offset disk 500, each aperture 508 opens into a larger cavity 524. The cavity 524 is sized to allow a sufficient volume of area to pass through the aperture 508 with minimum pressure drop. In the preferred embodiment, the cavity 524 tapers from the vacuum-side face 506 where the radially aligned opening has a preferred dimension of 0.42"×0.5" toward the seed-side face 504 where the cavity terminates in a ⅜ inch diameter upon meeting with the smaller bore of the aperture 508.

Preferably located at the same diameter as the pitch diameter 513, a plurality of dimples or indentations 526 are disposed on the seed plane 522. In FIG. 8, for example, the dimples 526 are shown equally spaced between adjacent radially spaced apertures 508, but may be grouped or spaced or disposed in multiple rows as previously described with respect to the apertures 508. These small dimples 526 also serve to agitate the seed in the seed pool (identified later) near the exterior periphery of the offset disk 500. An additional benefit of these dimples is that they serve to dislodge debris or seeds which may be caught under the leading edge 1010 (FIG. 18 discussed later) of the wiper member 1002.

It is known that the height of seed within the seed pool area can affect the performance of the meter. It has also been found that when the apertures of a vacuum disk pass through the seed pool at a radius further away from the radius of the cylindrical side wall of the seed pool, the seed will not load as effectively onto the apertures when compared to apertures passing through the seed pool at a radius closer to the radius of the cylindrical side wall of the seed pool. Thus, it is desirable to control the amount of seed within the seed pool and to place the apertures near the side wall of the seed pool. With these considerations in mind, it should be appreciated that because the pitch diameter 513 of the apertures 508 on the offset disk 500 is less than the pitch diameter of the apertures 208 in the flat disk 200, a liner 600 is preferably provided to accommodate this difference in pitch diameter. However, the liner 600 is also preferably configured such that once installed, it need not be removed from the back cover 116 when switching between the offset disk 500 and the standard conventional disks such as the celled disk 100, the flat disk 200 or other specialty crop disks with which the vacuum meter 28 has been designed for use.

Figure 12:
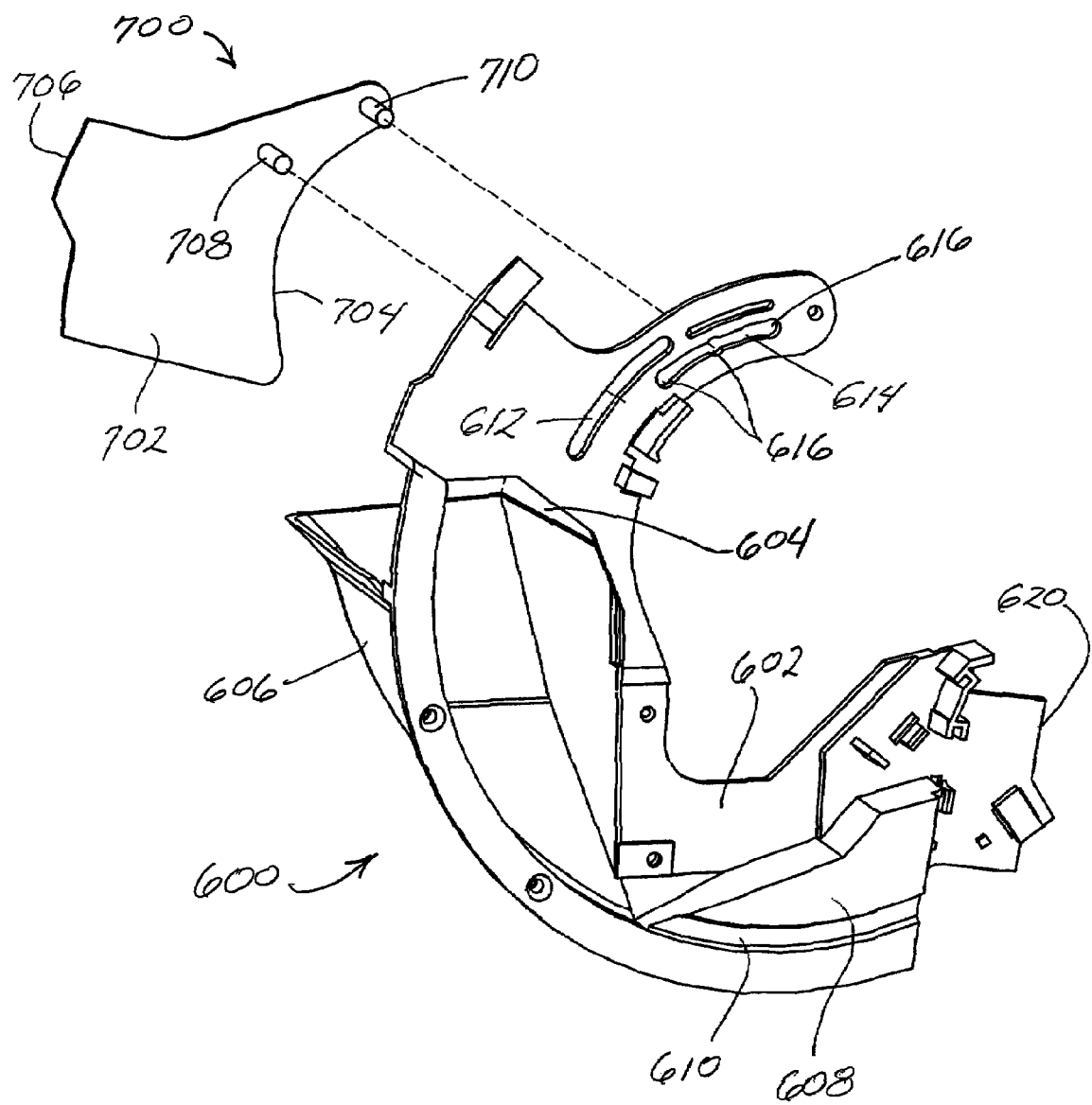
FIG. 12 is a more detailed perspective view of the preferred embodiment of the liner and baffle of the vacuum meter of FIG. 6.

A preferred embodiment of the liner 600 is illustrated in FIGS. 7 and 12. The liner 600 is preferably formed of a wear resistant rigid polymer material and configured to be received within the seed pool area 128 and is preferably secured to the back cover 116 by tapping screws or other conventional means. The liner 600 preferably includes a substantially planar face 602 with an opening 604 therein. When installed in the back cover 116, the planar face 602 preferably substantially covers the area previously defining the seed pool area 128 except at the opening 604. A chute 606 sized to be received within the inlet chute 124 extends rearwardly from the face 602. The sidewalls of the chute 606 direct the seeds into the opening 604 and prevent the seeds from entering the void between the back cover 116 and the planar face 602.

Figure 13:
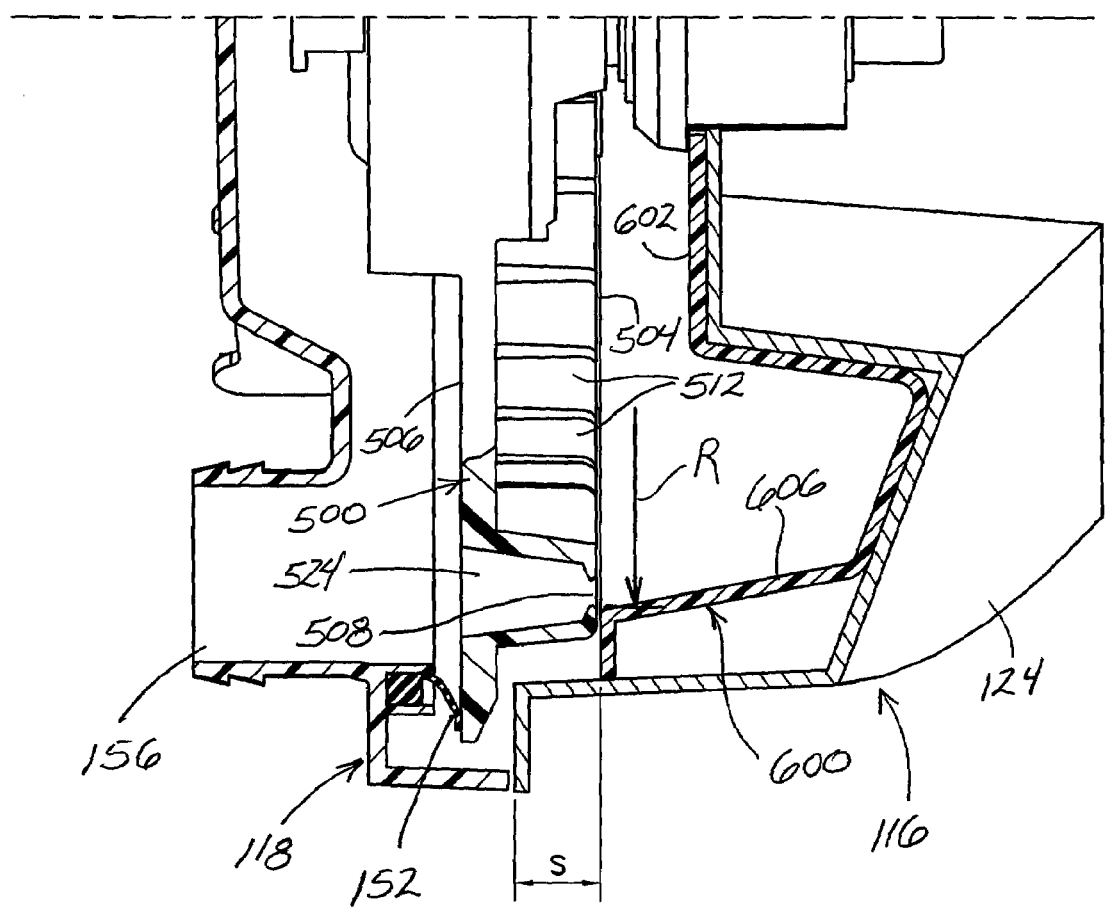
FIG. 13 is a cross-sectional view of the liner and seed pool area as viewed along lines 13-13 of FIG. 6.
Figure 14:
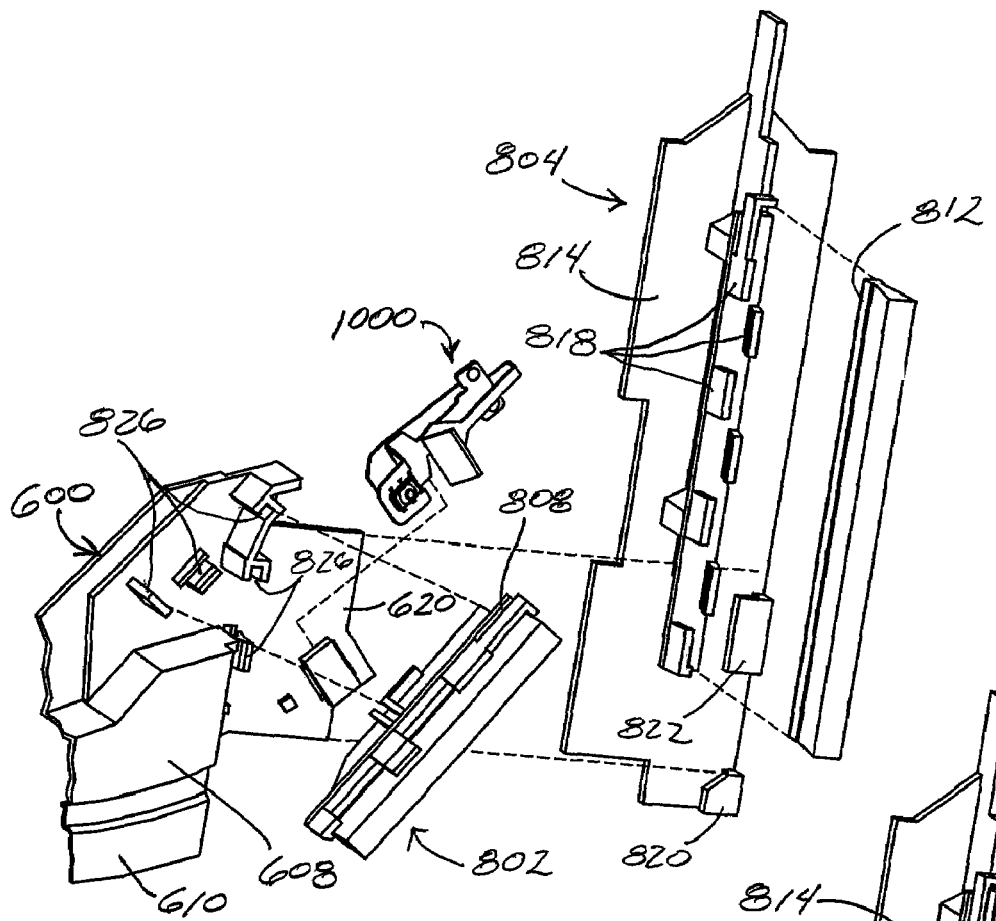
FIG. 14 is an exploded perspective view of a preferred embodiment of the isolator brush of the vacuum meter of FIG. 6 showing the short brush section being installed for use with an offset disk.
Figure 15:
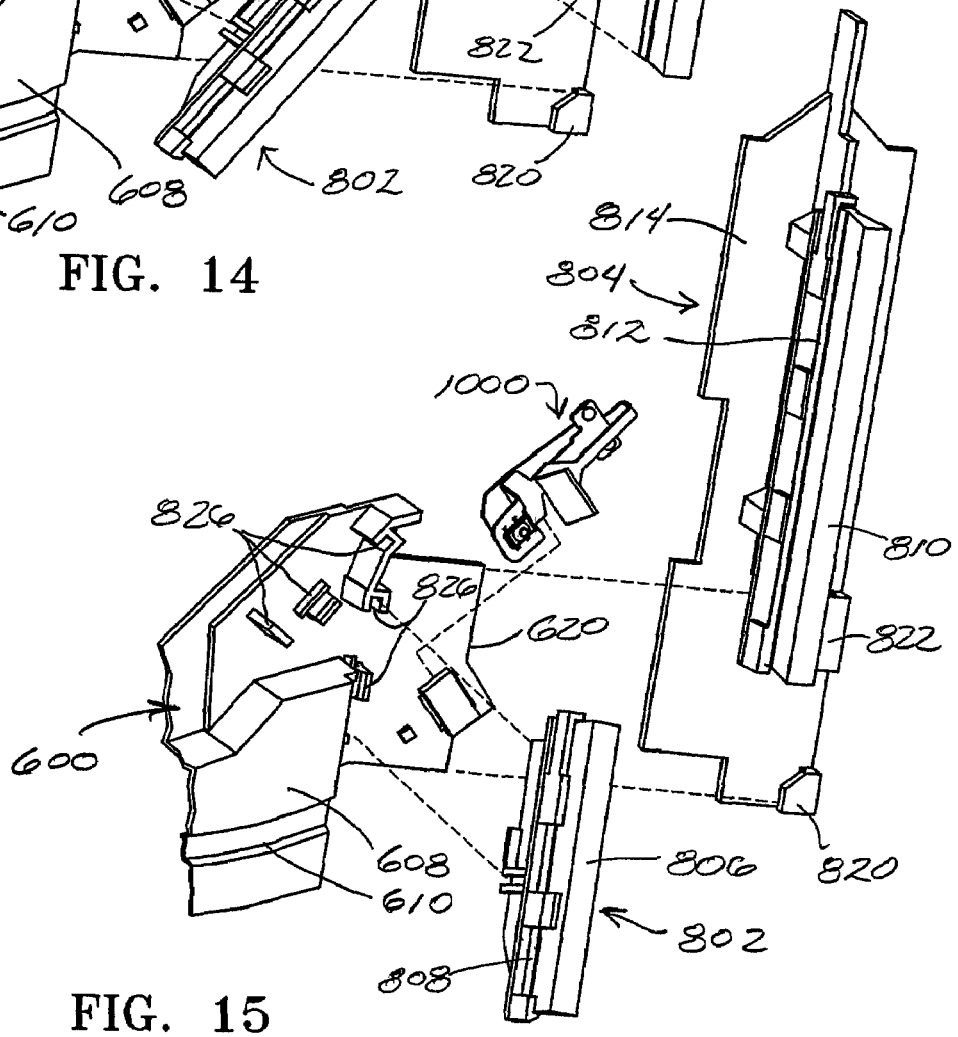
FIG. 15 is an exploded perspective view of the isolator brush of FIG. 14, but with the short brush section being installed for use with a conventional celled-disk or conventional flat non-celled disk.

As best illustrated in FIG. 13, which is a cross-sectional view showing the liner 600 disposed within the back cover 116 as viewed along lines 13-13 of FIG. 6, the radius of curvature of the outer edge of the opening 604 and chute 606 is preferably only slightly larger than the outside radius R2 of the apertures 508 on the seed-side face 504 of the offset disk 500. The chute 606 is preferably configured with a setback as indicated by reference "S" so that the liner 600 may remain in place within the back cover 116 of the housing 114 without interfering with or affecting the operation of the meter when it is desired to switch back to a conventional celled-disk 100 or the flat disk 200. The liner 600 may remain in place because seed will be permitted to enter the space S and the vertical plane of the seed-side face 104 of the celled disk 100 and/or the seed-side face 204 of the flat disk 200 (both of which substantially correspond to the base plane 520 of the offset disk 500) thereby permitting seeds within the seed pool area to fill the space S for loading the disks 100, 200. In the preferred embodiment, the space or setback S is preferably approximately 0.600 inches.

Referring back to FIGS. 7 and 12, the liner 600 preferably includes a raised surface 608 which preferably serves to restrict the area within the back cover 116 previously defining the seed pool area 128. The raised portion 608 preferably includes a groove or channel 610 having an outside radius corresponding to the radius "R" previously defined and an inside radius slightly less than the radius to the inside edge of the aperture 508. The purpose of the channel 610 is to permit any seeds 33, seed fragments or debris that may have become lodged in one of the apertures 508 and which was not removed by the fragment extractor 1000 (discussed later) to rotate past the raised surface 608 through the recessed channel 610 so the seed or fragment is not be pushed further into the aperture 508 so it can be removed by the fragment extractor 1000 on the next rotation.

A preferred embodiment of a baffle 700 is illustrated in FIGS. 7 and 12. In this embodiment, the baffle 700 comprises a substantially planar member 702 having an arcuate inward edge and 704 and a outward edge 706. In the preferred embodiment the baffle 700 is disposed between the back wall 120 of the back cover 116 and the liner 600. Accordingly, the distance between the outward edge and the inward edge 704 is preferably less than the distance between the sidewall 122 and the hub 136 of the back cover 116. The upper portion of the liner 600 preferably includes arcuate slots 612, 614 which frictionally receive pegs 708, 710 projecting from the planar member 702. In the preferred embodiment the arcuate slot 614 preferably includes enlarged openings 616 at each end and in the middle of the slot 614. These enlarged openings 616 in the slot 614 define three preferred baffle positions for regulating the flow of seed 33 through the chute 606 and opening 604.

Figure 16:
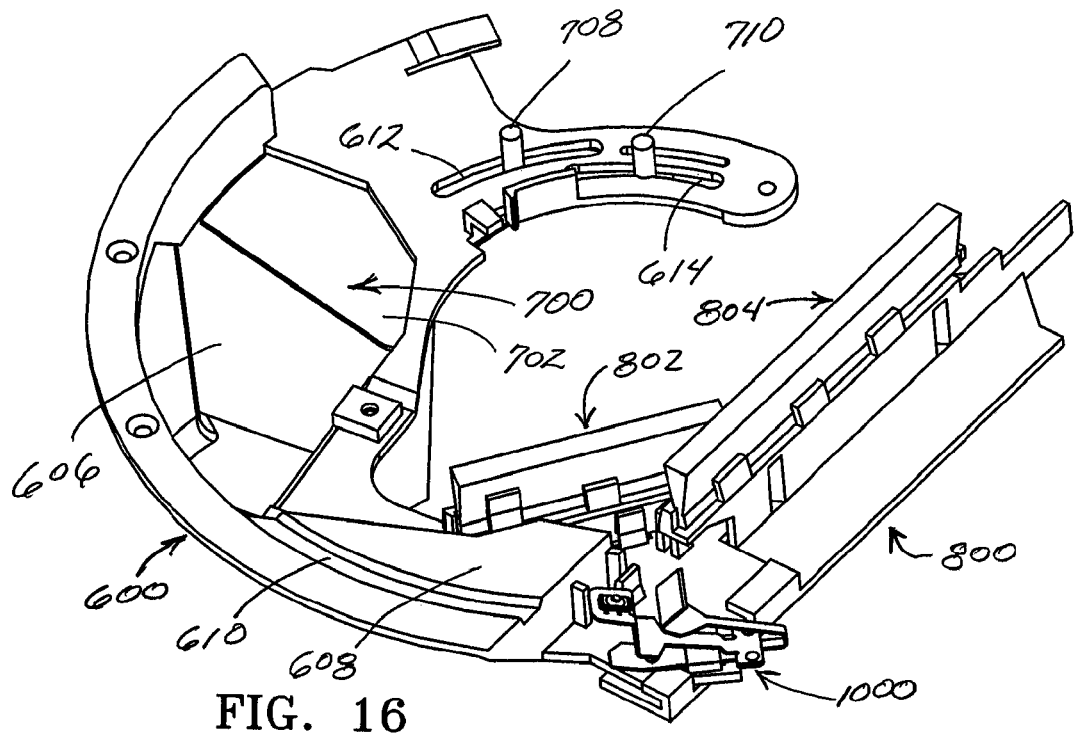
FIG. 16 is a perspective view showing the isolator brush assembly of FIG. 14 installed for use with an offset disk.
Figure 17:
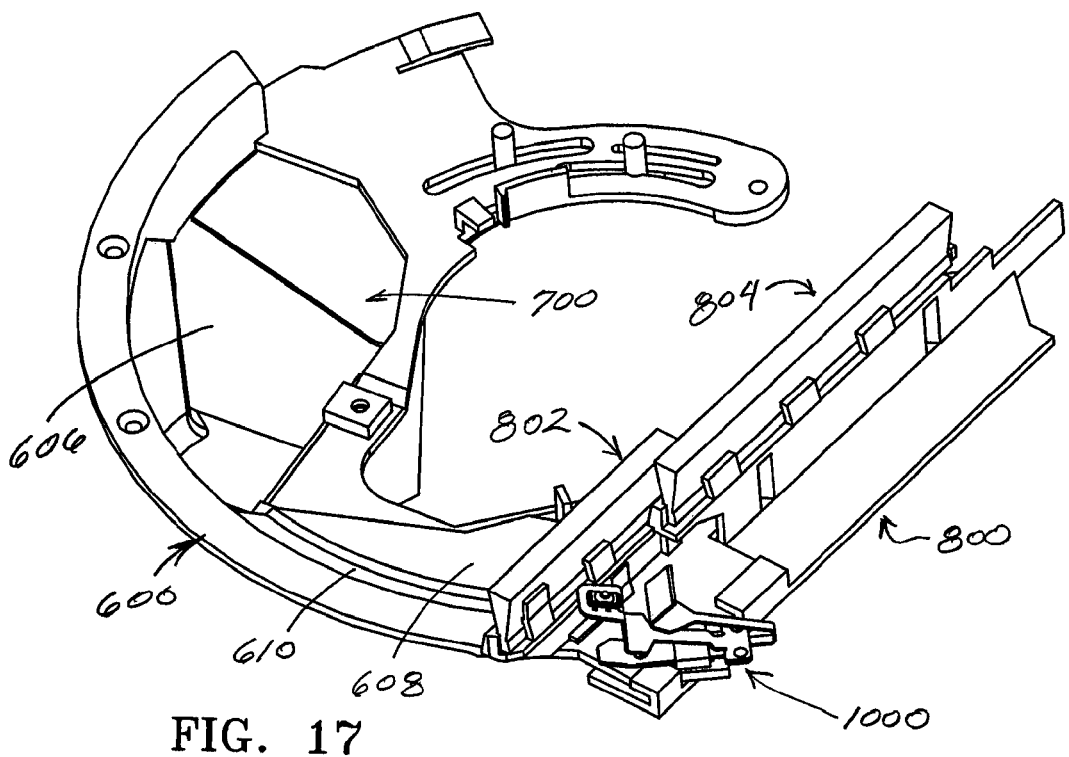
FIG. 17 is a perspective view of the isolator brush of FIG. 14, but with the short brush section installed for use with a conventional celled-disk or conventional flat non-celled disk.

A preferred embodiment of the isolator brush assembly 800 is illustrated in FIGS. 7 and 14-17. In the preferred embodiment, the isolator brush assembly 800 includes a short brush section 802 and a long brush section 804. The short brush section 802 is preferably movable depending on the type of disk 100, 200, 500 being used. FIG. 16 illustrates the position of the short brush section 802 for use with the offset disk 500. FIG. 17 illustrates the position of the short brush section 802 when the conventional celled-disk 100 or flat non-celled disk 200 is being used.

In the preferred embodiment the brush sections 802, 804 are preferably strip brushes comprising bristles 806, 810 fastened into a semi-rigid spine 808, 812. The bristles are preferably nylon but may be made from any other suitable bristle material. The long brush section 804 is preferably removably secured to a base 814. The base 814 preferably includes upper and lower T-mounts (not visible) adapted to be received within the existing T-slots 816 (FIG. 7) formed in the back-cover 116 of the housing 114 used to mount the conventional isolator brush 126 (now removed). The base 814 preferably includes a series of rigid tabs 818 (FIG. 14) into which the spine 812 securely snaps or securely slidably engages. The lower end of the base 814 includes a corner slot 820 and a side slot 822 into which the edge 620 of the liner 600 is preferably received. Similarly, a series of tabs 826 project up from the liner 600 into which the spine 810 of the short brush section 802 is received. The tabs 826 are located to position the short brush into the two positions illustrated in FIGS. 16 and 17 as just described depending on the disk 100, 200, 500 being used in the housing 114.

Figure 18:
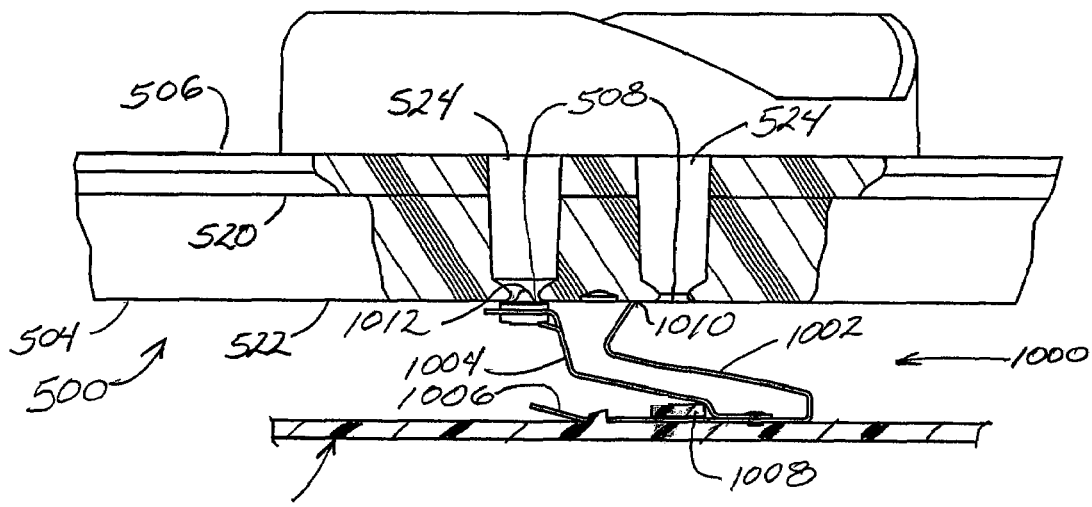
FIG. 18 is a side elevation view of a preferred embodiment of the fragment extractor of the vacuum meter of FIG. 6 shown with a partial cross sectional view of the offset disk.
Figure 19:
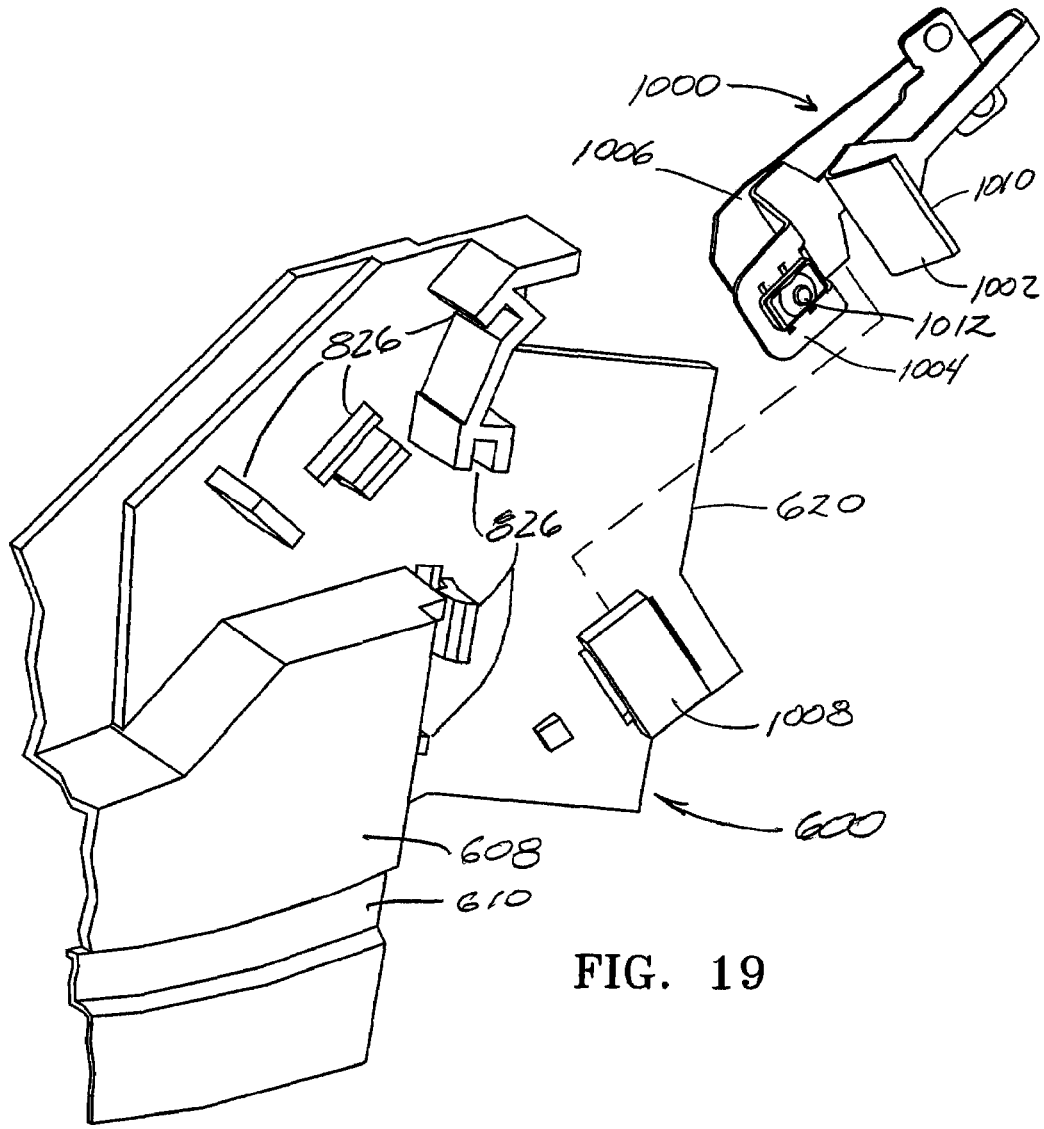
FIG. 19 is an exploded perspective view showing the mounting of the fragment extractor of FIG. 18 to the liner.

Referring to FIG. 18, a preferred embodiment of a fragment extractor 1000 is illustrated. It should be appreciated that because of the depth of the disk 500, it is not practical to provide a fragment extractor from the vacuum side 506 of the disk as is the practice with vacuum meters using conventional celled-disks 100 or flat non-celled disks 200. The fragment extractor 1000 includes a leading wiper member 1002 and a trailing hammer member 1004 secured or formed integral with to a based 1006. The base 1006 is preferably slidably received within a raised slot 1008 formed in the liner 600 into which the base 1006 is removably, but securely fixed. Both the wiper member 1002 and hammer member 1004 are preferably made from thin metal material which is bent so that the members 1002, 1004 are biased against the seed plane 522 of the offset disk 500. The wiper member 1002 has a leading edge 1010 disposed against the seed plane 522 and positioned at an angle with respect thereto, such that upon making contact with a seed or fragment caught in the aperture 508, the angle of the leading edge will tend to exert a pulling force on the seed or fragment as the offset disk 500 continues to rotate. However, if the fragment resists being pulled out by the wiper member 1002, the leading edge 1010 is preferably capable of cutting or sheering the seed or fragment flush with the seed plane 522. Any fragments remaining in the aperture 508 that have been sheered off by the leading edge 1010 will next rotate toward the hammer member 1004. Preferably, the hammer member 1004 includes a hardened steel projection 1012 that is sized to fit within the aperture 508. It should be appreciated that because the hammer member 1004 is biased against the seed plane 522, as the disk rotates toward the hammer member 1004, the projection 1012 will preferably enter the aperture 508 with sufficient force to smash or crack the fragment or seed so that it will be sucked out of the aperture 508 by the vacuum pressure or fall out of the aperture by gravity. If the fragment is not removed on the current pass, repeated hammering by the projection 1012 each time the fragment rotates past the hammer member 1004 will eventually crack or break up the fragment and open the aperture 508.

Figure 20:
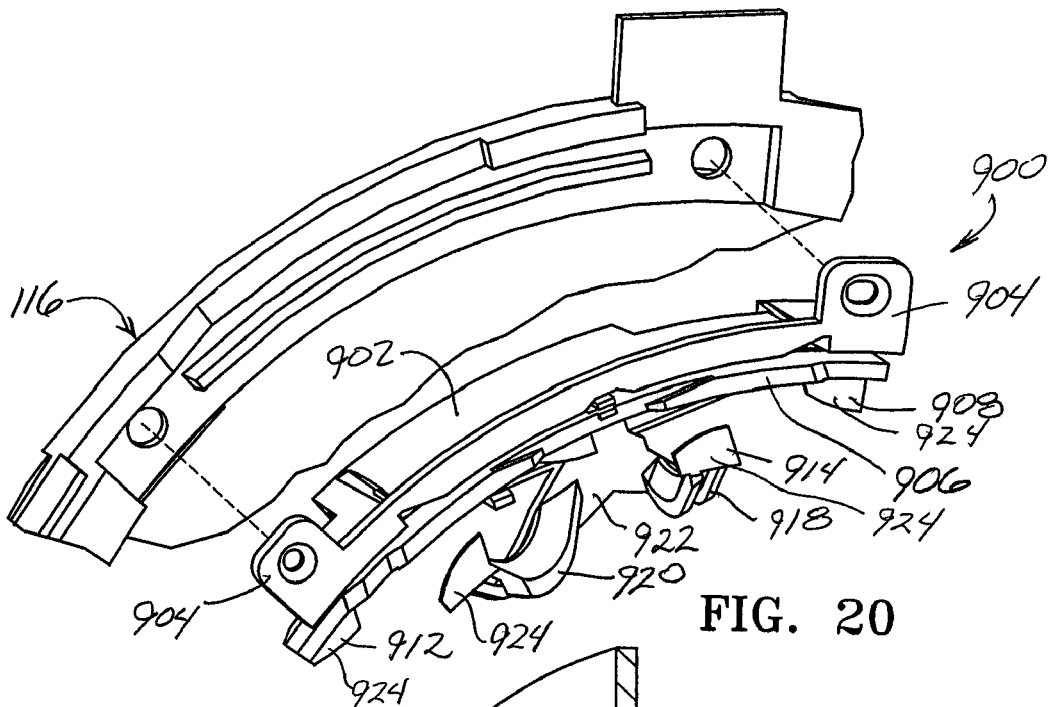
FIG. 20 is an exploded perspective view of a preferred embodiment of the seed singulator assembly for the vacuum meter of FIG. 6.
Figure 21:
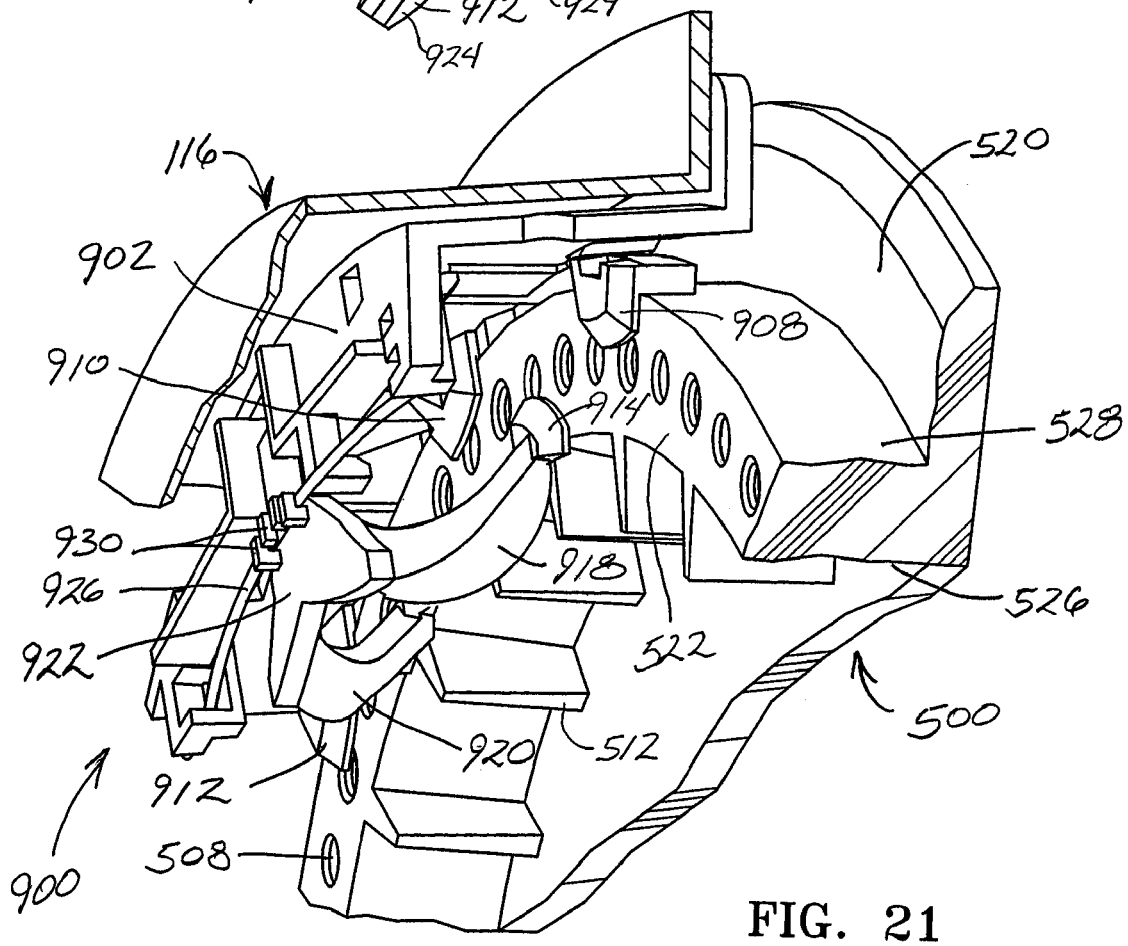
FIG. 21 is a detailed perspective view showing the singulator assembly of FIG. 20 in use on an offset disk.

A preferred embodiment of a seed singulator assembly 900 is shown in FIGS. 20 and 21. The singulator assembly 900 includes a singulator base 902 which mounts in a conventional manner to the back cover 116 of the housing 114 through two mounting ears 904. The base 902 provides a secure platform from which the other components comprising the singulator assembly 900 are supported. It is known that singulation performance improves with an increasing number of times that the seeds are contacted by the singulating lobes. It has been determined that superior singulation accuracy is achieved by bumping or agitating the seeds from both the top side (i.e., the outside radius R2 (FIG. 8) of the apertures) and the bottom side (i.e., the inside radius R3 (FIG. 8) of the apertures). For example, if a singulator is used that only bumps the seeds from the top side, then some seeds multiples may be able to "hang" on the very bottom of the aperture and would not be stripped or removed by the top singulator. Furthermore, it has been found that singulation can be best achieved when the seed is contacted three times from the top side of the apertures 508 relative to the path of travel and two times from the bottom side of the apertures 508.

Accordingly, in the preferred embodiment, a rail 906 supports three lobes 908, 910, 912. As illustrated in FIG. 21, these three lobes 908, 910, 912 are disposed on the top side of the apertures 508. The rail 906 has an inner face 913 having a radius of curvature that is preferably substantially the same or slightly larger than the radius R4 of the shoulder 530. Continuing to refer to FIG. 21, two bottom lobes 914, 916 are preferably supported by two divergent arms 918, 920 extending from an L-shaped bracket 922 connected to the rail 906. The bottom lobes 914, 916 are also preferably made of a wear resistant and durable material such as metal or brass using the investment casting or metal injection molding process. Each of the lobes 908, 910, 912, 914, 916 has a surface 924 that is co-planar with the other lobes. As shown in FIG. 21, these co-planar surfaces 924 are disposed adjacent the seed plane 522 of the offset disk 500.

Figure 22:
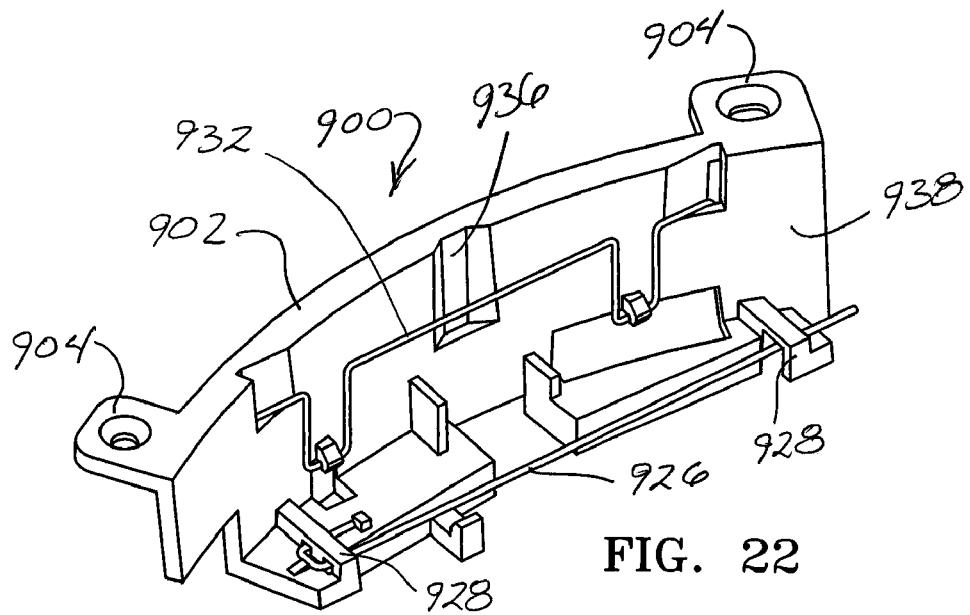
FIG. 22 is a perspective view of a preferred embodiment of a base for the seed singulator of FIG. 20.

Referring to FIG. 22, in the preferred embodiment, a first wire 926 is supported at each end by tabs or slots in the base 902. As illustrated in FIG. 21, this first wire 926 is preferably received within hooks 930 disposed on the L-shaped bracket 922. This first wire 926 serves as an axial spring which biases the co-planar surfaces 924 of the lobes 908, 910, 912, 914, 916 against or in contact with the seed plane 522 of the disk 500.

Figure 24:
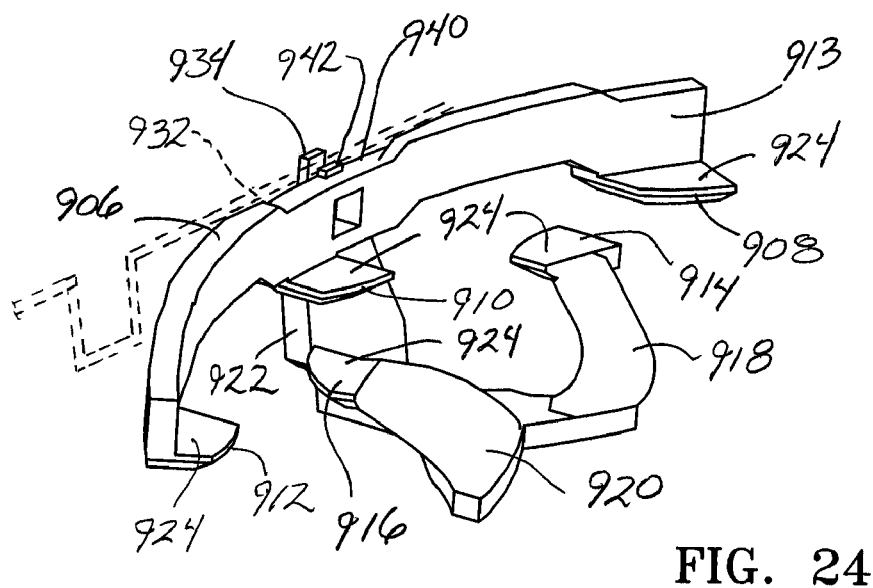
FIG. 24 is a bottom perspective view of the rail for the seed singulator of FIG. 20.

Continuing to refer to FIG. 22, a second wire 932 is secured at or near its ends to the base 902. Disposed on the back side of the rail 906 is a tongue 934 which is receivable by and is slidable within a groove 936 formed in the top wall 938 of the base 902. The tongue 934 within the groove 936 also receives the second wire 932 as best illustrated in FIG. 24. Thus, the second wire 932 serves as a radial spring which biases the inner face 913 of the rail 906 against the top or outside diameter of the cylindrical wall 528 of the disk.

Figure 25:
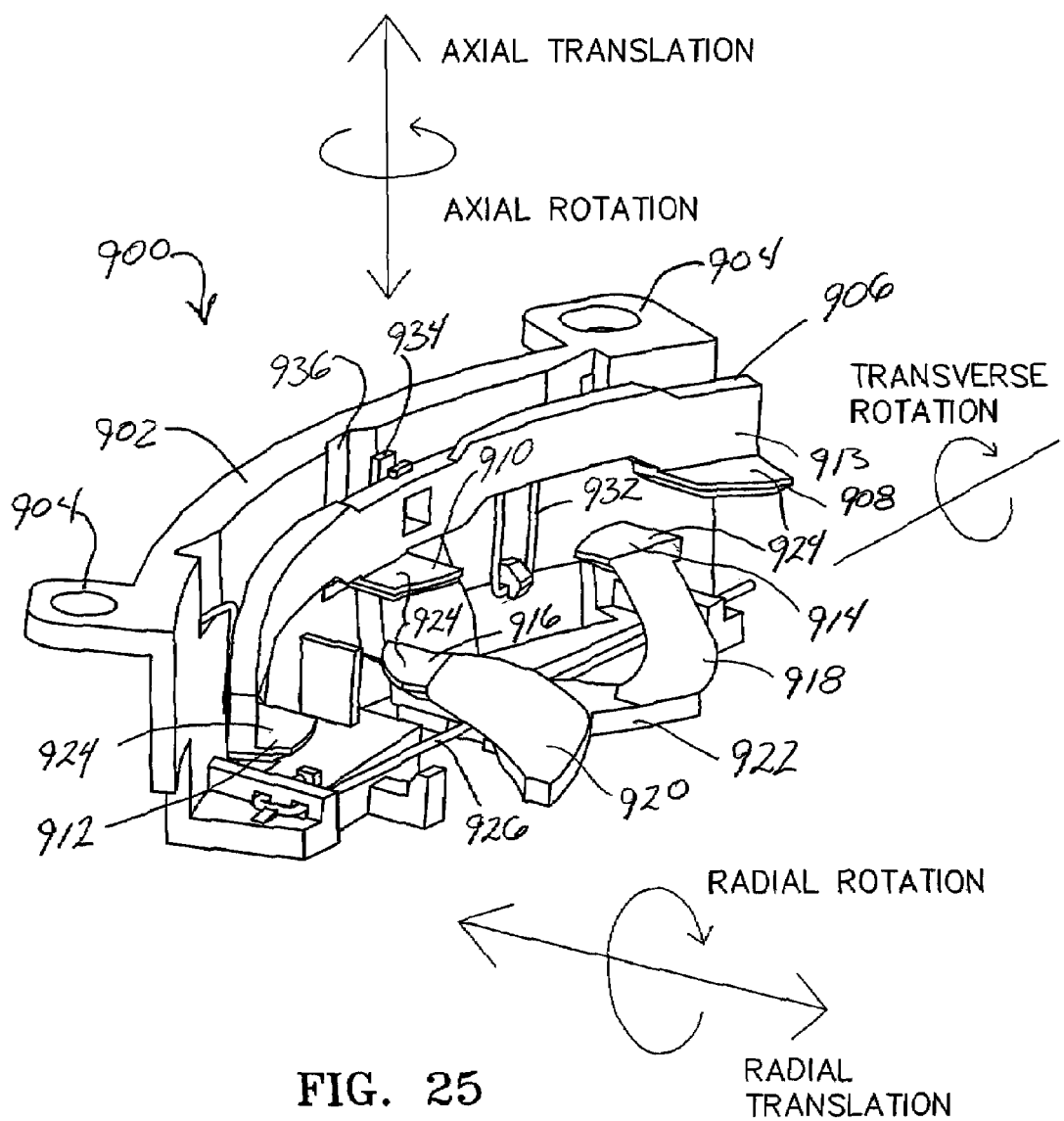
FIG. 25 is a perspective view of the seed singulator of FIG. 20 illustrating the various degrees of freedom that can be achieved by the preferred embodiment.

It should be appreciated that the preferred embodiment permits the lobes 908, 910, 912, 914, 916 to "float" with the seed plane 522 and the cylindrical shoulder 530 of the offset disk 500. This ability to float provides inherent advantages not only for use with an offset disk 500 but for celled-disks 100 and flat disks 200. For example, during rotation, the disk 100, 200, 500 may translate about the central axis due to warping, or as a result of the bearing or hub 136 being out of alignment, or possibly due to bending or flexing of the disk 100, 200, 500 caused by the pressure differential between the seed-side face and the vacuum side face of the disk. Additionally, the disk 100, 200, 500 may be subject to radial translation caused by improper hub alignment, mounting tolerances or disk eccentricities associated with the manufacturing process or manufacturing tolerances. FIG. 25 illustrates the various degrees of freedom that is provided by the foregoing spring biased suspension system of the seed singulator assembly 900.

Thus, by providing a singulator with lobes that float with and remain in contact with the seed-side face 504 and in contact with outer periphery of the shoulder 530, the singulator assembly 900 is able to compensate for both radial translation and axial translation and radial rotation of the disk, while at the same time the amount of coverage of the apertures 508 by the passing lobes 908, 910, 912, 914, 916 remains constant regardless of the movement of the disk 500. Additionally, the spring biased suspension of the lobes permits the lobes to flex away from the apertures 508 in the case a seed or fragment becomes stuck in the aperture. This flexure prevents adverse wear to the surfaces 924 and edges of the lobes and also improves performance by preventing sudden jerking of the disk due to seeds wedging between an inflexible or immovable singulator and the aperture.

Figure 23:
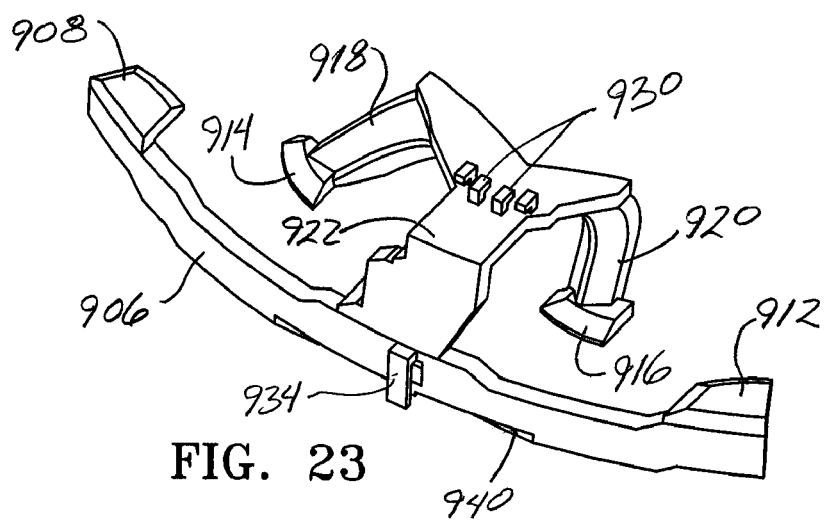
FIG. 23 is a top perspective view of a preferred embodiment of the rail for the seed singulator of FIG. 20.

A further advantage of the preferred embodiment of the spring suspension system is that the singulator assembly 900 need not be removed when switching from the offset disk 500 to the celled disk 100 (with which a singulator is not generally used). Instead, in the preferred embodiment, the rail 906 is capable of being locked into a depressed position whereby the lobes 908, 910, 912, 914, 916 will not contact the seed-side face 104 of the disk 100. Referring to FIGS. 22, 23 and 24, a groove 940 is formed in the top side edge of the rail 906. A tab 942 also projects from the top side edge of the rail 906. By depressing the rail 906 downwardly and rearwardly relative to the base 902, the tab 942 can be forced behind the second wire 932 such that the second wire 932 locks the rail in place in the downward or depressed position with the second wire 932 disposed on the top edge of the rail 906 and resting groove 940.

The foregoing description is presented to enable one of ordinary skill in the art to make and use the invention and is provided in the context of a patent application and its requirements. Various modifications to the preferred embodiment of the apparatus, such as the various alternative embodiments disclosed in co-pending U.S. Provisional Application No. 60/710,014 incorporated herein in its entirety, and the general principles and features described herein will be readily apparent to those of skill in the art. Thus, the present invention is not to be limited to the embodiments of the apparatus and methods described above and illustrated in the drawing figures, but is to be accorded the widest scope consistent with the spirit and scope of the appended claims.

The invention claimed is:

1. A vacuum meter, comprising:
a housing having a seed discharge chute, said discharge chute having a central axis;
an offset disk rotatably disposed within said housing, said offset disk having a vacuum-side face and a seed-side face, said seed-side face having a base plane and a seed plane, said seed plane axially offset a distance from said base plane whereby said seed plane is disposed in substantial vertical alignment with said central axis of said seed discharge chute, a plurality of radially spaced apertures extending transversely through said offset disk from vacuum-side face to said seed plane, said radially spaced apertures disposed at a radius R1 from a centerline of said offset disk, said radially spaced apertures further having an outside radius R2 and an inside radius R3 from said disk centerline.

2. The vacuum meter of claim 1 further comprising a singulator assembly.

3. The vacuum meter of claim 2 further comprising an isolator brush assembly.

4. The vacuum meter of claim 3 further comprising a liner.

5. The vacuum meter of claim 4 further comprising a baffle.

6. The vacuum meter of claim 5 further comprising a fragment extractor for removing fragments lodged in said apertures from said seed side face of said offset disk.

7. The vacuum meter of claim 6 wherein said liner includes a substantially planar face portion having an opening therein, said planar face having an outer peripheral edge slightly less than an inside radius of a back cover of the housing into which the liner is disposed, said substantially planar face defining a seed pool area.

8. The vacuum meter of claim 7 wherein said baffle cooperates with the liner to regulate the flow of seed through said liner opening.

9. The vacuum meter of claim 8 wherein said fragment extractor includes a wiper member supported by said liner along a path of travel of said apertures of said offset disk when disposed in said housing of said vacuum meter, and wherein said wiper member is biased against said seed plane of said offset disk.

10. The vacuum meter of claim 9 wherein said fragment extractor further includes a hammer supported by said liner along said path of travel of said apertures and spaced along said path of travel behind said wiper, said hammer biased against said seed plane of said offset disk and further including a projection that at least partially enters each of said apertures as said apertures rotate along said path of travel.

11. The vacuum meter of claim 3 wherein said isolator brush assembly comprises a long brush section and a short brush section, said short brush section movable with respect to said long brush section between a first position and a second position.

12. The vacuum meter of claim 2 wherein said singulator assembly includes a first member having upper lobes disposed at a radius of curvature slightly less than said radius R2.

13. The vacuum meter of claim 12 wherein said singulator assembly further includes a second member having lower lobes disposed at a radius of curvature slightly greater than said radius R3.

14. The vacuum meter of claim 13 wherein said upper and lower lobes of said singulator assembly have coplanar surfaces.

15. The vacuum meter of claim 14 wherein said coplanar surfaces of said singulator assembly are biased axially against said seed plane of said offset disk.

16. The vacuum meter of claim 15 wherein said singulator assembly includes three upper lobes and two lower lobes.

17. The vacuum meter of claim 15 wherein said offset disk has a cylindrical shoulder extending between said base plane and said offset seed plane, said cylindrical shoulder having a radius R4 from said disk centerline.

18. The vacuum meter of claim 17 wherein said first member of said singulator assembly has a surface with a radius of curvature substantially the same as said radius R4.

19. The vacuum meter of claim 18 wherein said surface of said first member of said singulator assembly is biased radially against said cylindrical shoulder of said offset disk.

20. The vacuum meter of claim 19 wherein said first member and said second member of said singulator assembly comprise a single unitary element.

21. The vacuum meter of claim 20 wherein said singulator assembly further includes an axial spring and a radial spring disposed within a base member whereby said axial spring biases said singly unitary element in a axial direction and said radial spring biases said singly unitary element in a radial direction.

22. A seed meter disk for rotation within a housing of a vacuum seed meter having a seed discharge chute, the seed discharge chute having a central axis offset a distance X from a base plane, the seed disk comprising:

a circular disk member having an outer periphery, a vacuum-side face and a seed-side face, said seed-side face having a shoulder with an outside diameter less than said outer periphery, said shoulder defining a seed plane offset axially from a remainder portion of said seed-side face of said circular disk member a distance approximately equal to the distance X;

a plurality of radially spaced apertures extending transversely through said circular disk member from said vacuum-side face to said seed plane;

wherein when said circular disk is disposed in the seed meter housing, said seed plane is in substantial vertical alignment with the central axis of the seed discharge chute.

23. The seed meter disk of claim 22 wherein said seed plane includes indentations disposed between said apertures.

24. The seed meter disk of claim 22 further including a plurality of radially spaced seed agitating ribs disposed around an inside diameter of said shoulder.

* * * * *